United States Patent
Son et al.

(10) Patent No.: US 12,232,034 B2
(45) Date of Patent: *Feb. 18, 2025

(54) WIRELESS COMMUNICATION METHOD USING WAKE-UP RADIO AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Juhyung Son, Gyeonggi-do (KR); Jinsam Kwak, Gyeonggi-do (KR); Geonjung Ko, Gyeonggi-do (KR); Woojin Ahn, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 423 days.

This patent is subject to a terminal disclaimer.

(21) Appl. No.: 17/702,779

(22) Filed: Mar. 23, 2022

(65) Prior Publication Data

US 2022/0232473 A1    Jul. 21, 2022

Related U.S. Application Data

(63) Continuation of application No. 16/254,600, filed on Jan. 23, 2019, now Pat. No. 11,343,768, which is a
(Continued)

(30) Foreign Application Priority Data

Jul. 24, 2016 (KR) .................. 10-2016-0093860
Sep. 11, 2016 (KR) .................. 10-2016-0116896
(Continued)

(51) Int. Cl.
*H04W 52/02* (2009.01)
*H04W 84/12* (2009.01)

(52) U.S. Cl.
CPC ... *H04W 52/0222* (2013.01); *H04W 52/0216* (2013.01); *H04W 52/0219* (2013.01);
(Continued)

(58) Field of Classification Search
CPC ......... H04W 52/0222; H04W 52/0216; H04W 52/0219; H04W 52/0229; H04W 52/0235; H04W 84/12
See application file for complete search history.

(56) References Cited

U.S. PATENT DOCUMENTS 9,736,277 B2 *   8/2017 Lee .................. H04L 69/10
11,343,768 B2 *  5/2022 Son .................. H04W 52/0229
(Continued)

FOREIGN PATENT DOCUMENTS

KR    10-2012-0023610    3/2012
KR    10-2013-0142947    12/2013
WO    2018/021779        2/2018

OTHER PUBLICATIONS

International Search Report for PCT/KR2017/007952 mailed on Nov. 17, 2017 and its English translation from WIPO (now published as WO 2018/021779).
(Continued)

*Primary Examiner* — Erika A Washington
(74) *Attorney, Agent, or Firm* — WOMBLE BOND DICKINSON (US) LLP

(57) ABSTRACT

Provided is a wireless communication terminal that communicates wirelessly. The terminal includes: a wireless LAN (WLAN) transceiver configured to transmit and receive a WLAN signal; and a wake-up radio (WUR) receiver configured to receive a WUR signal. The WUR receiver is
(Continued)

configured to receive a wake-up packet from a base wireless communication terminal and wakes-up the WLAN transceiver. A part of the WUR signal is transmitted by a modulation method different from a modulation method of the WLAN signal.

12 Claims, 24 Drawing Sheets

Related U.S. Application Data continuation of application No. PCT/KR2017/007952, filed on Jul. 24, 2017.

(30) Foreign Application Priority Data

Nov. 6, 2016 (KR) .................. 10-2016-0147188
Jan. 16, 2017 (KR) .................. 10-2017-0007331

(52) U.S. Cl.
CPC ... *H04W 52/0229* (2013.01); *H04W 52/0235* (2013.01); *H04W 84/12* (2013.01); *Y02D 30/70* (2020.08)

(56) References Cited

U.S. PATENT DOCUMENTS

| | | |
|---|---|---|
| 2013/0022154 A1 | 1/2013 | Hambeck et al. |
| 2014/0126442 A1 | 5/2014 | Jafarian et al. |
| 2014/0254445 A1 | 9/2014 | Heinzelman et al. |
| 2016/0183187 A1 | 6/2016 | Park |
| 2016/0278013 A1 | 9/2016 | Shellhammer et al. |
| 2017/0094600 A1 | 3/2017 | Min et al. |
| 2018/0020404 A1 | 1/2018 | Huang et al. |
| 2018/0020405 A1 | 1/2018 | Huang et al. |
| 2018/0020409 A1 | 1/2018 | Aboul-Magd et al. |
| 2018/0027485 A1 | 1/2018 | Kneckt et al. |
| 2018/0242250 A1 | 8/2018 | Huang et al. |
| 2019/0159127 A1 | 5/2019 | Son et al. |
| 2019/0289549 A1* | 9/2019 | Lim .................. H04W 52/0219 |

OTHER PUBLICATIONS

Written Opinion of the International Searching Authority for PCT/KR2017/007952 mailed on Nov. 17, 2017 and its English translation by Google Translate (now published as WO 2018/021779).

Park, Min-Young et al., "LP-WUR (Low-Power Wake-up Receiver) Follow up", doc.: IEEE 802.11-16/0341r0, slides 1-9, Mar. 14, 2016. See slides 3-5, 12.

Hsu, Frank et al., "LP TOR Wake-up Packet Identity Considerations", doc.: IEEE 802.11-16/0402r0, slides 1-9, Mar. 13, 2016. See slide 3.

Office Action dated Feb. 1, 2021 for Korean Patent Application No. 10-2019-7002133 and its English translation provided by Applicant's foreign counsel.

Notice of Allowance dated Jan. 26, 2022 for U.S. Appl. No. 16/254,600 (now published as US 2019/0159127).

Advisory Action dated Nov. 19, 2021 for U.S. Appl. No. 16/254,600 (now published as US 2019/0159127).

Final Office Action dated Aug. 3, 2021 for U.S. Appl. No. 16/254,600 (now published as US 2019/0159127).

Office Action dated Feb. 17, 2021 for U.S. Appl. No. 16/254,600 (now published as US 2019/0159127).

Final Office Action dated Oct. 16, 2020 for U.S. Appl. No. 16/254,600 (now published as US 2019/0159127).

Office Action dated Jun. 26, 2020 for U.S. Appl. No. 16/254,600 (now published as US 2019/0159127).

* cited by examiner

WIRELESS COMMUNICATION METHOD USING WAKE-UP RADIO AND WIRELESS COMMUNICATION TERMINAL USING SAME

CROSS-REFERENCE TO RELATED APPLICATIONS

This application is a continuation of U.S. patent application Ser. No. 16/254,600 filed on Jan. 23, 2019, which is a continuation of International Patent Application No. PCT/KR2017/007952 filed on Jul. 24, 2017, which claims the priority to Korean Patent Application No. 10-2016-0093860 filed in the Korean Intellectual Property Office on Jul. 24, 2016, Korean Patent Application No. 10-2016-0116896 filed in the Korean Intellectual Property Office on Sep. 11, 2016, Korean Patent Application No. 10-2016-0147188 filed in the Korean Intellectual Property Office on Nov. 6, 2016, and Korean Patent Application No. 10-2017-0007331 filed in the Korean Intellectual Property Office on Jan. 16, 2017, the entire contents of which are incorporated herein by reference.

TECHNICAL FIELD

The present invention relates to a wireless communication method and a wireless communication terminal using a wake-up radio.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Particularly, as a mobile device including an embedded battery as a power source is spread and the use time of the mobile device becomes important, the energy efficiency of wireless communication terminals is also becoming important. Therefore, there is a need for a wireless communication method capable of increasing the energy efficiency of a wireless communication terminal. In relation to the main method used to increase energy efficiency in a wireless LAN, the wireless communication terminal may enter the power saving mode when the wireless communication terminal is not used. However, since the wireless communication terminal entering the power save mode does not perform wireless communication, wireless communication between the wireless communication terminal and the external device may be restricted. Also, in order to receive a wireless signal from an external device to the wireless communication terminal, the wireless communication terminal may have to periodically stop the power save mode. Accordingly, suggested is a method of a wireless communication terminal to use a separate wake-up radio that triggers the interruption of the power save mode. When the wireless communication terminal uses the wake-up radio, the wireless communication terminal includes a wake-up radio receiver for receiving a wake-up radio at a low power. In the power save mode, the wireless communication terminal may receive the wake-up radio through the wake-up radio receiver.

DISCLOSURE

Technical Problem

An embodiment of the present invention is to provide a wireless communication terminal using a wake-up radio.

Technical Solution

According to an embodiment of the present invention, a wireless communication terminal communicating wirelessly includes: a wireless LAN (WLAN) transceiver configured to transmit and receive a WLAN signal; and a wake-up radio (WUR) receiver configured to receive a WUR signal. The WUR receiver is configured to receive a wake-up packet from a base wireless communication terminal and wake-up the WLAN transceiver. A part of the WUR signal is transmitted by a modulation method different from a modulation method of the WLAN signal.

The wake-up packet may be distinguished into a legacy part that the WLAN transceiver is capable of demodulating and a wake-up part that the WLAN transceiver is not capable of demodulating, wherein the legacy part may include a legacy preamble part, which is a preamble included in a WLAN physical layer protocol data unit (PPDU), and an additional preamble transmitted after the legacy preamble part. The additional preamble part may signal that the legacy part is included in the wake-up packet.

The WLAN transceiver may determine that the legacy part is included in the wake-up packet based on a modulation method of the additional preamble.

The WLAN transceiver may be configured to determine that the received PPDU is a wake-up packet based on whether the modulation method of the additional preamble is Binary Phase Shift Keying (BPSK).

The WUR receiver may be configured to wake up the WLAN transceiver after an arbitrary time from when receiving the wake-up packet.

The arbitrary time may be calculated based on a time designated by the wake-up packet.

The arbitrary time may be calculated based on a time designated by the wake-up packet and a time required for waking up the WLAN transceiver.

The WLAN transceiver may be configured to signal the time required for waking up the WLAN transceiver to the base wireless communication terminal.

The WLAN transceiver may be configured to access a channel based on a priority of data to be received in a wake-up subsequent operation sequence.

The WUR receiver may be configured to deliver information obtained from the wake-up packet to the WLAN transceiver.

According to an embodiment of the present invention, a base wireless communication terminal communicating wirelessly includes: a wireless LAN (WLAN) transceiver configured to transmit and receive a WLAN signal; and a wake-up radio (WUR) transmitter configured to transmit a WUR signal. The WUR transmitter transmits to a wireless communication terminal a wake-up packet indicating information related to wake-up of the wireless communication terminal. A part of the WUR signal is transmitted by a modulation method different from a modulation method of the WLAN signal.

The WUR transmitter may insert into the wake-up packet a legacy part that the WLAN transceiver is capable of demodulating and a wake-up part that the WLAN transceiver is not capable of demodulating, wherein a legacy preamble part, which is a preamble included in a WLAN physical layer protocol data unit (PPDU), and an additional preamble transmitted after the legacy preamble part may be inserted into the legacy part. The additional preamble part may signal that the legacy part is included in the wake-up packet.

The WUR transmitter may be configured to modulate the additional preamble part through a predetermined modulation method to signal that the legacy part is included in the wake-up packet.

The WUR transmitter may be configured to modulate the additional preamble part with Binary Phase Shift Keying (BPSK).

The WUR transmitter may be configured to transmit wake-up information related to wake-up of a plurality of wireless communication terminals to the plurality of wireless communication terminals including the wireless communication terminal using the wake-up packet.

The WUR transmitter may be configured to transmit the wake-up part for each of the plurality of wireless communication terminals using different frequency bands.

The WUR transmitter may be configured to insert information on a time at which the wireless communication terminal wakes up and start a subsequent operation sequence into the wake-up packet.

The WUR transmitter may be configured to determine a time for starting the subsequent operation sequence based on a time required for waking up the wireless communication terminal.

The WLAN transceiver may be configured to receive a time required for waking up the wireless communication terminal from the wireless communication terminal.

When a first transmission or a first reception fails in a wake-up subsequent operation sequence, the WUR transmitter may be configured to transmit the wake-up packet again to the wireless communication terminal.

Advantageous Effects

An embodiment of the present invention provides a wireless communication method using a wake-up radio and a wireless communication terminal using the same.

[Mode for Carrying out the Invention]

Figure 1:
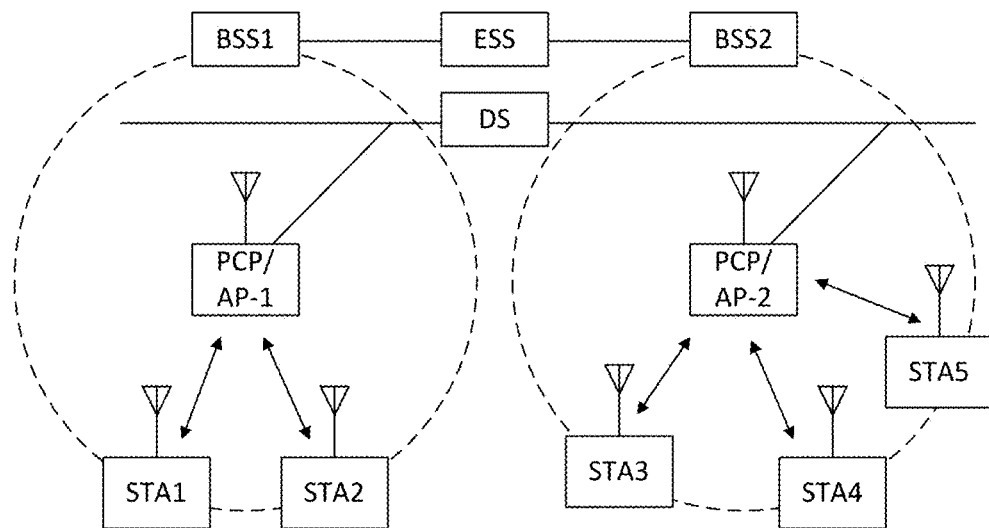
FIG. 1 shows a wireless LAN system according to an embodiment of the present invention.

Preferred embodiments of the present invention will be described below in more detail with reference to the accompanying drawings. The present invention may, however, be embodied in different forms and should not be construed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0074090 (2016.07.24), Nos. 10-2016-0116896 (2016.09.11), Nos. 10-2016-0147188 (2016.11.06) and Nos. 10-2017-0007331 (2017.01.16) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
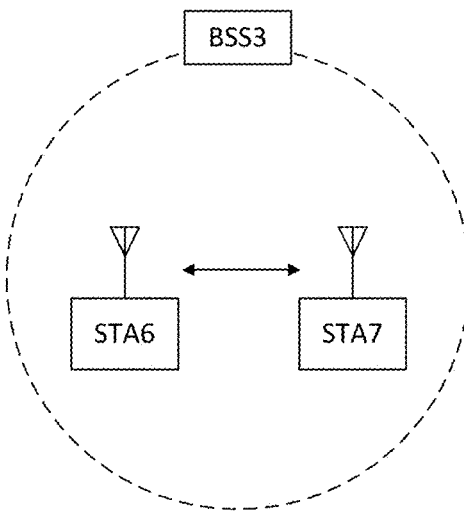
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
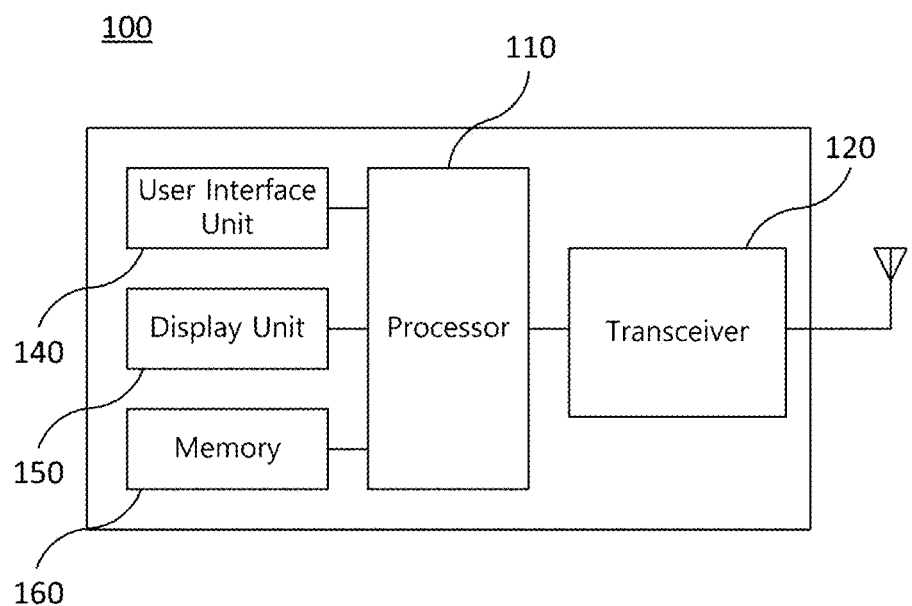
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
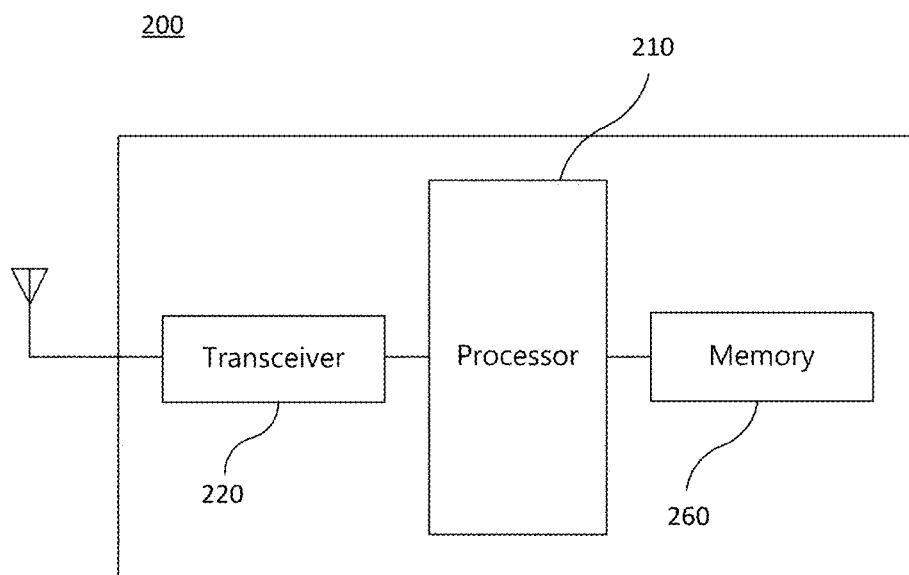
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
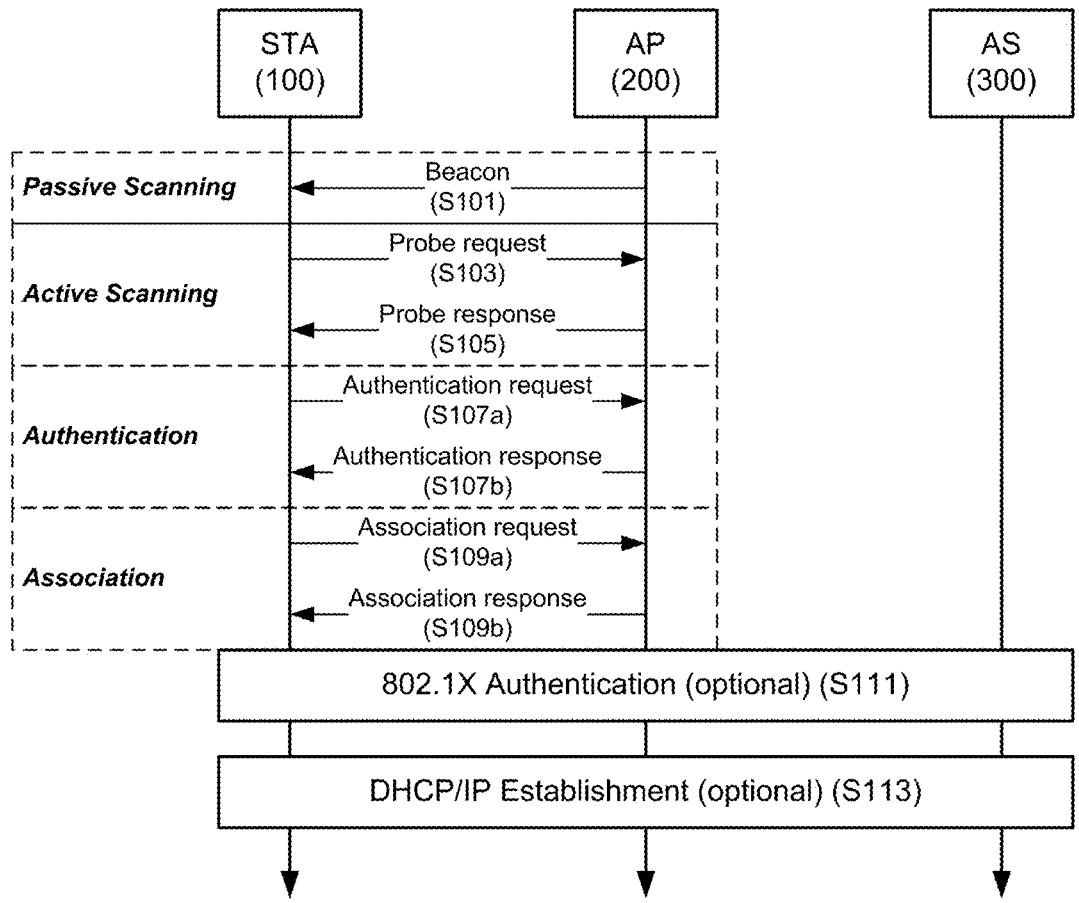
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The wireless communication terminal may enter the power save mode when the wireless communication terminal does not perform any other operation for energy efficiency. At this point, the power save mode may indicate an operation mode in which the wireless communication terminal cuts off power related to a part of the functions of the wireless communication terminal to increase energy efficiency. The power save mode may be referred to as a sleep mode, and the interruption of the power saving mode by the wireless communication terminal may be referred to as wake-up. In the power saving mode, the wireless communication terminal may also restrict the communication function. The wireless communication terminal may periodically wake up to receive a wireless signal from an external device. However, this operation may lower the operation efficiency of the wireless communication terminal.

When the wireless communication terminal wakes up in a power save mode according to a wake-up radio (WUR) for instructing wake-up, the operation efficiency of the wireless communication terminal may be increased. In addition, when WUR is used, the time during which the wireless communication terminal stays in the power saving mode is increased, and the power efficiency may be increased. Accordingly, the wireless communication terminal includes a WUR receiver WURx that operates at a lower power than a transmission/reception unit that transmits and receives general wireless signals, and may wake up according to WUR in a power saving mode in which functions such as general wireless signal transmission and reception are suspended. For this, a part of the WUR signal may be transmitted in a different modulation method than the general wireless signal modulation method. For example, a part of the WUR signal may be transmitted through On-Off Keying (OOK). For convenience of description, this power save operation is referred to as a WUR-based power save mode. The operation of the wireless communication terminal including the WURx and the wireless communication method using the WUR will be described with reference to FIGS. 6 to 30.

Figure 6:
FIG. 6 shows a network including a wireless communication terminal supporting WUR based power save.
Figure 6:
Figure 6:
Figure 6:
Figure 6:
Figure 6:
Figure 6:
Figure 6:
Figure 6:

FIG. 6 shows a network including a wireless communication terminal supporting WUR-based power save.

In the embodiment of FIG. 6, the first BSS operated by the first AP A coexists with the second BSS operated by the second AP B. The first BSS includes a first WUR station WUR STA1, a second WUR station WUR STA2, and a third WUR station WUR STA3 that perform a power save operation based on the WUR. Also, the first BSS includes a legacy station Legacy STA AL that does not support 802.11ax based WLAN and does not support WUR-based power save and a legacy station Legacy STA AH that supports 802.11ax based WLAN and does not support WUR-based power save. The second BSS also includes a fourth WUR station WUR STA4, a fifth WUR station WUR STA5, and a sixth WUR station WUR STA6 that perform WUR-based power save operations. Also, the second BSS includes a legacy station Legacy STA BL that does not support 802.11ax based WLAN and does not support WUR-based power save and a legacy station Legacy STA BH that supports 802.11ax based WLAN and does not support WUR-based power save.

Both the first BSS and the second BSS include a plurality of stations supporting WUR-based power save. Therefore, it is necessary to prevent a wireless communication terminal other than a wireless communication terminal that requires wake-up from unnecessarily waking up. The WUR may instruct the wake-up of a specific wireless communication terminal among the plurality of wireless communication terminals. Specifically, the wake-up packet transmitted through the WUR may include an identifier indicating a wireless communication terminal being instructed wake-up. This will be described in detail with reference to FIG. 29. Further, when WUR is transmitted for each of a plurality of wireless communication terminals, WUR continuously uses radio resources. Also, many overheads may be used for wake-up packet transmission. Therefore, the wireless communication terminal may wake up a plurality of wireless communication terminals using one wake-up packet. This will be described in more detail with reference to FIG. 11.

Also, both the first BSS and the second BSS include legacy stations that do not support WUR-based power save. Therefore, it is necessary that the WUR does not cause malfunction of the legacy wireless communication terminal or disturb the operation of the legacy wireless communication terminal. For this, the wake-up packet may include legacy parts that the WLAN transceiver WLAN TR is capable of demodulating. Specifically, the legacy part may indicate a portion of a wake-up packet that the legacy wireless communication terminal is capable of decoding. This will be described in more detail with reference to FIG. 8.

In addition, WURx receives the wake-up packet, and instructs the transceiver transmitting and receiving the general wireless signal to wake up so that it may take a long time for the transceiver to operate. Therefore, an operation sequence considering the time required for the transceiver to operate after the wake-up is needed. This will be described in detail with reference to FIG. 12.

Figure 7:
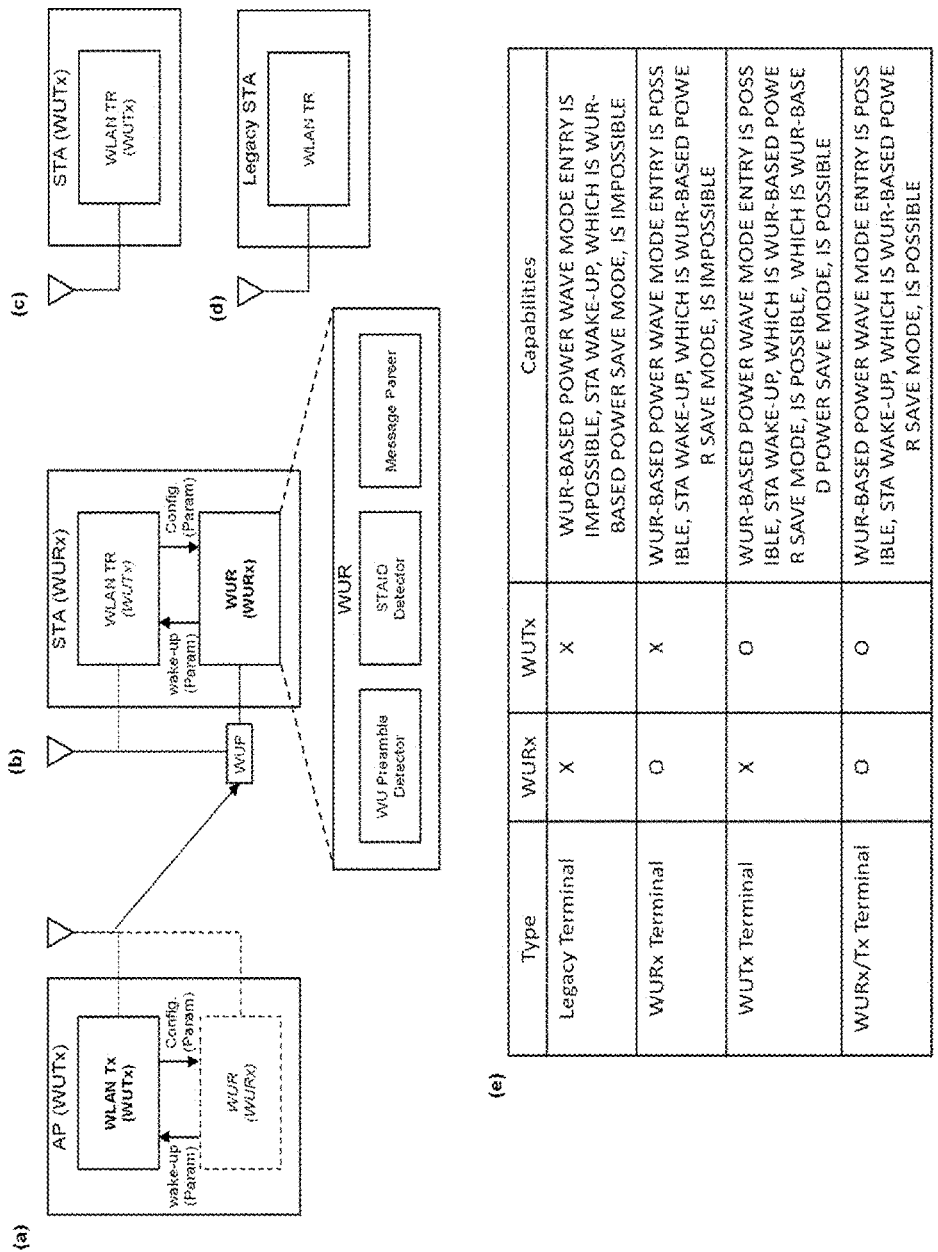
FIG. 7 shows a structure of a wireless communication terminal supporting a communication method using WUR and a classification of wireless communication terminals according to WUR-related functions.

FIG. 7 shows a structure of a wireless communication terminal supporting a communication method using WUR and a classification of wireless communication terminals according to WUR-related functions.

FIG. 7(a) shows an AP supporting a wake-up of a station supporting a WUR-based power save in a station in the BSS operated by the AP. The AP includes a WLAN transceiver (TR) that supports general WLAN communication, and may include a wake-up transmitter (WUTx) for transmitting the WUR. Specifically, the AP may transmit a wake-up packet using WUTx. At this point, the 802.11 transceiver may also perform the role of WUTx. In addition, if the AP may enter WUR-based power save mode, the AP may include WURx.

FIG. 7(b) shows a station supporting WUR-based power save. Wireless communication terminals supporting WUR-based power save may include a WURx. At this point, a WURx may exist separately from a WLAN TR. In addition, the WURx may wake up the WLAN TR through the internal interface. At this point, the WURx may transmit information on the subsequent operation sequence to the WLAN TR through the internal interface. Specifically, the information on the operation sequence may be a Sequence ID (SID) identifying the subsequent operation. In addition, the WLAN TR may set the parameters of WURx required for WUR-based power save operation through the internal interface. Specifically, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The wireless communication terminal identifier detector detects the receiver of the wake-up packet. At this point, the wireless communication terminal identifier detector may obtain information for identifying the receiver of the wake-up packet based on the preamble of the wake-up packet. In addition, the wireless communication terminal identifier detector may obtain information for identifying the receiver of the wake-up packet based on the wake-up (WU) signaling field of the wake-up packet. In addition, the wireless communication terminal identifier detector may obtain information for identifying the receiver of the wake-up packet based on the preamble and the WU signaling field of the wake-up packet. The WU signaling field detector signals information related to the wake-up indicated by the wake-up packet.

The message parser parses the message that the wake-up packet includes. Specifically, the message parser may parse the message included in the wake-up packet to obtain the message indicated by the wake-up packet.

FIG. 7(c) shows another station supporting WUR-based power save. In addition, a wireless communication terminal supporting WUR-based power save may transmit a wake-up packet using the WLAN TR.

FIG. 7(d) shows a legacy station that does not support WUR-based power save. Legacy stations that do not support WUR-based power save include a WLAN TR, but may not transmit wake-up packets using the WLAN TR.

FIG. 7(e) shows a classification of wireless communication terminals according to the WUR-related functions. The wireless communication terminal may be classified based on whether WUR-based power saving mode entry is possible and whether WUP transmission is possible. Specifically, a wireless communication terminal that may not enter the WUR-based power save mode and may not transmit a wake-up packet may be classified as a legacy terminal. Also, a wireless communication terminal that may enter the WUR-based power save mode and may not transmit a wake-up packet may be classified as a WUR receiving terminal (WURx Terminal). Also, a wireless communication terminal that may not enter the WUR-based power save mode and may transmit a wake-up packet may be classified as a WUR transmitting terminal (WURx Terminal). Also, a wireless communication terminal that may enter the WUR-based power save mode and may transmit a wake-up packet may be classified as a WUR transmitting terminal (WURx/Tx Terminal).

Figure 8:
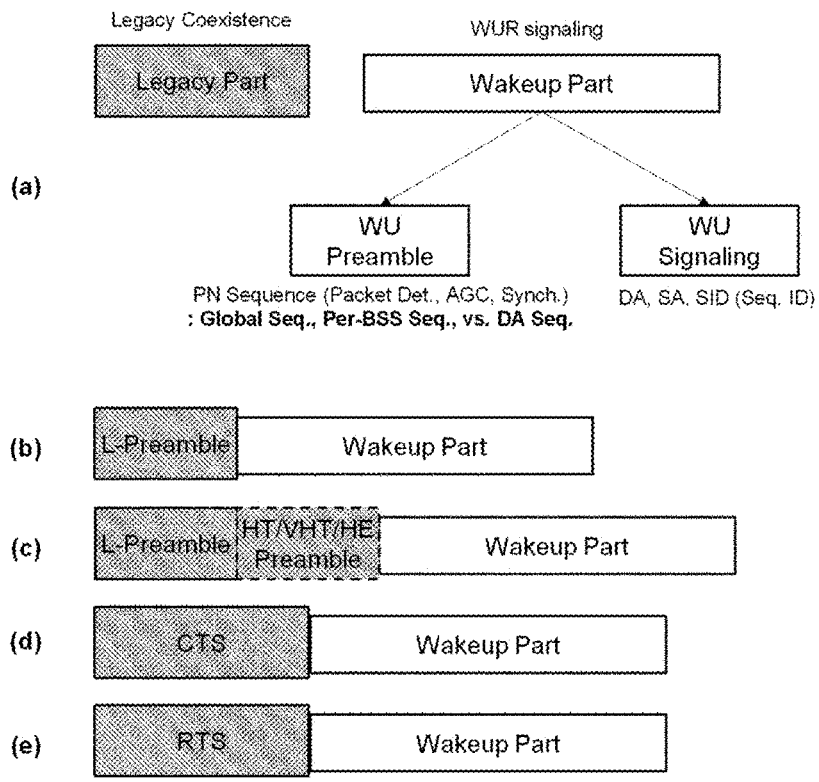
FIG. 8 shows a format of a wake-up packet according to an embodiment of the present invention.

FIG. 8 shows a format of a wake-up packet according to an embodiment of the present invention.

As described above, the wake-up packet may include legacy parts that the WLAN TR is capable of demodulating. Specifically, the wake-up packet may be divided into a legacy part that the WLAN TR is capable of demodulating and a wake-up part that the WLAN TR is not capable of demodulating. At this point, the wake-up part may include a WU preamble and a signaling field. As described above, a part of the wake-up packet may be transmitted in a modulation method different from the modulation method of the WLAN signal. Specifically, the WU preamble may include a signal pattern sequence indicating that the WU preamble is a wake-up packet. In a specific embodiment, WUTx may insert a signal pattern sequence indicating a wake-up packet into the WU preamble. For example, the WUTx may insert a modulation-based pseudo-noise sequence into the WU preamble. At this point, the WUTx may insert a pseudo noise sequence by using On-Off Keying (OOK) in the WU preamble. In addition, the WURx may detect a wake-up packet by detecting a signal pattern sequence indicating a wake-up packet. Specifically, WURx may detect a wake-up packet by detecting a pseudo-noise sequence. In a specific embodiment, the WURx may detect a wake-up packet by detecting a pseudo-noise sequence generated by OOK.

At this point, the signal pattern sequence may be a pattern identically applied to all wireless communication terminals supporting WUR-based power save. At this point, the wireless communication terminal supporting the WUR-based power save may start receiving the wake-up packet and may parse the WU signaling field to determine whether the receiver of the corresponding wake-up packet is the wireless communication terminal. Therefore, the overhead of wireless communication terminals supporting WUR-based power save may increase.

In another specific embodiment, the signal pattern sequence may be a pattern identifying a wireless communication terminal supporting WUR-based power save associated with the same BSS. At this point, the wireless communication terminal supporting the WUR-based power save may selectively receive the wake-up packet transmitted from the BSS with which the wireless communication terminal is associated. The wireless communication terminal may not receive the wake-up packet transmitted from another BSS but is required to receive the wake-up packet transmitted from the same BSS to another wireless communication terminal.

In another specific embodiment, the signal pattern sequence may be a pattern that identifies the receiver of the wake-up packet. At this point, the wireless communication terminal supporting the WUR-based power save may selectively receive the wake-up packet that the wireless communication terminal is the receiver. The signal pattern sequence for identifying the receiver of the wake-up packet may include information identifying the wireless communication terminal. However, the information identifying the wireless communication terminal may be a part of the identifier of the wireless communication terminal. Further, the information identifying the wireless communication terminal may be information obtained by abbreviating the identifier of the wireless communication terminal.

In addition, the WUTx may insert a legacy preamble, which is a preamble included in the Physical Layer Protocol Data Unit (PPDU) of the WLAN, into the legacy part. Specifically, the legacy preamble may include an L-STF including a short training signal, an L-LTF including a long training signal, and an L-SIG including signaling information for a legacy terminal. The legacy terminal may determine the length of the wake-up packet based on the L-SIG field. Thus, the legacy terminal may not access the frequency band in which the wake-up packet is transmitted while the wake-up packet is transmitted. The specific format of a wake-up packet may be as shown in FIG. 8(b).

Also, the WUTx may include a preamble separate from the legacy preamble included in the PPDU of the WLAN in a legacy part. Specifically, the WUTx may insert a legacy preamble included in the PPDU of the WLAN and a non-legacy preamble included in the PPDU of the WLAN into the legacy part. At this point, the legacy part may include a part of the legacy preamble included in the PPDU of the WLAN and the non-legacy preamble included in the PPDU of the WLAN. In a specific embodiment, the non-legacy preamble may be any one or a part of a High Throughput (HT) preamble, a Very High Throughput (VHT) preamble, and a High Efficiency (HE) preamble. For example, a legacy part may include an HE-SIG-A field. At this point, the legacy terminal may operate based on the information indicated by HE-SIG-A. Specifically, the legacy terminal may perform a spatial reuse operation based on the information indicated by the HE-SIG-A. In a specific embodiment, the legacy terminal may determine whether a wake-up packet has been transmitted from the BSS associated with the legacy based on the information indicated by HE-SIG-A. At this point, the legacy terminal may access the channel through which the wake-up packet is transmitted based on the determination of whether the wake-up packet is transmitted from the BSS associated with the legacy terminal. Also, the information indicated by HE-SIG-A may be the BSS color. In another specific embodiment, the information indicated by HE-SIG-A may be a TXOP duration. At this point, the legacy terminal may not access the frequency band in which the wake-up packet is transmitted during the TXOP duration indicated by the wake-up packet. The specific format of a wake-up packet may be as shown in FIG. 8(c).

In addition, the WUTx may insert a Clear-To-Send (CTS) frame into a legacy part. In yet another specific embodiment, the WUTx may insert a Request-To-Send (RTS) frame into the legacy part. At this point, the WUTx may transmit a legacy part and a wake-up part continuously without time interval of SIFS. Since both the legacy part and the wake-up part are transmitted by the same wireless communication terminal, this is because it is not necessary that the wireless communication terminal receiving the wake-up packet transitions the reception mode to the transmission mode or the wireless communication terminal transmitting the wake-up packet transitions the transmission mode to the reception mode. The legacy terminal is capable of decoding a CTS frame or an RTS frame included in the wake-up packet, and may set a network allocation vector (NAV) according to the value of the duration field of the CTS frame or the duration field value of the RTS frame. Thus, the wireless communication terminal that transmits the wake-up packet may protect the wake-up packet transmission from the legacy terminal through this embodiment. Particularly, when the legacy terminal receives the RTS frame and there is no subsequent transmission sequence for a predetermined time from when the RTS frame is transmitted, the legacy terminal may cancel the NAV set based on the RTS frame. For wake-up based power save operations, the wireless communication terminal may signal capabilities related to wake-up. This will be described with reference to FIG. 9.

Figure 9:
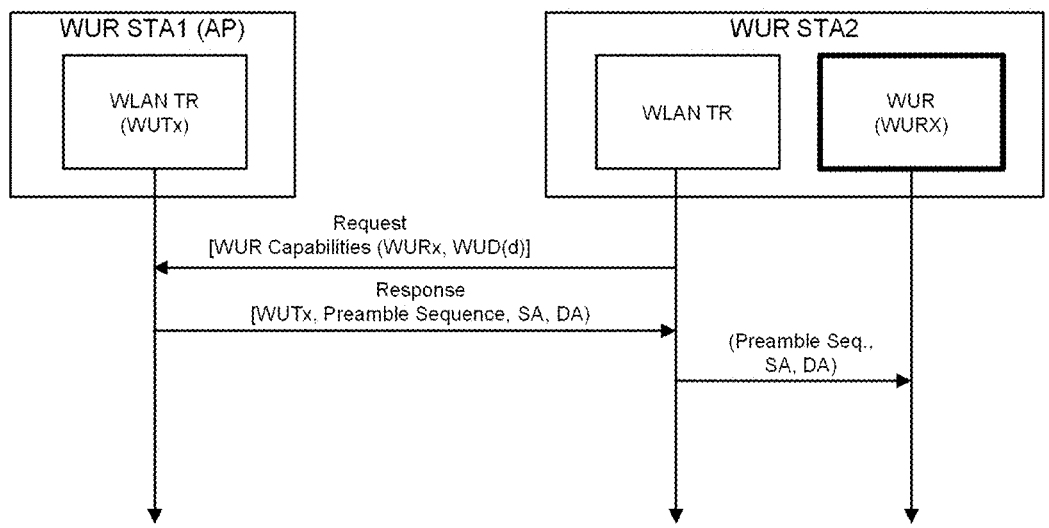
FIG. 9 shows that a wireless communication terminal according to an embodiment of the present invention signals capabilities related to wake-up.

FIG. 9 shows that a wireless communication terminal according to an embodiment of the present invention signals capabilities related to wake-up.

The wireless communication terminal may signal information related to the WUR function supported by the wireless communication terminal. Specifically, the wireless communication terminal may signal the WUR function supported by the wireless communication terminal. At this point, the wireless communication terminal may signal the classification of the wireless communication terminal according to the WUR related function. The classification of the wireless communication terminals according to the WUR related functions may be the same as that described with reference to FIG. 7. The wireless communication terminal including the WURx may signal to the wireless communication terminal including the WUTx the time required to wake up from the power save mode. Specifically, the time required for wake-up may indicate the time required for WURx to instruct the WLAN TR to wake-up and the WLAN TR to wake-up. The wireless communication terminal including the WURx may signal to the wireless communication terminal including the WUTx the time required to wake up from the power save mode in a link setup procedure.

Also, the wireless communication terminal including the WUTx may signal the signal pattern sequence included in the WU preamble of the wake-up packet. When the signal pattern sequence is different for each BSS or different for each wireless communication terminal, the wireless communication terminal including the WUTx may signal a plurality of signal pattern sequences. In addition, the signal pattern sequence may be the signal pattern sequence described with reference to FIG. 8. Also, the wireless communication terminal including the WUTx may signal at least one of a source address (SA) and a destination address (DA) to be used for the wake-up packet. At this point, the SA may be a part of the identifier of the wireless communication terminal. In addition, the SA may be information obtained by abbreviating the identifier of the wireless communication terminal. At this point, the DA may be a part of the identifier of the wireless communication terminal. In addition, the DA may be information obtained by abbreviating the identifier of the wireless communication terminal.

The wireless communication terminal may signal information related to the WUR function supported by the communication terminal through a WLAN frame. In the embodiment of FIG. 9, the second station WUR STA2 including the WURx transmits the request frame to the first station WUR STA1 which is the AP including a WUTx using a WLAN TR. At this point, the request frame includes the classification WURx of the second station WUR STA2 according to the WUR related function and the time WUD (d) required for wake up. Also, the first station WUR STA1 receives the request frame from the second station WUR STA2 using the WLAN TR. The first station WUR STA1 transmits a response frame for the request frame to the second station WUR STA2. At this point, the response frame may include a classification WUTx of the first station WUR STA1 according to the WUR related function, a signal pattern sequence Preamble Seq included in the WU preamble of the wake-up packet, an SA to be used for wake-up packets, and a DA to be used for wake-up packets. The second station WUR STA2 uses a WLAN TR to obtain from the wake-up packet at least one of a classification WUTx of the first station WUR STA1 according to the WUR related function, a signal pattern sequence Preamble Seq included in the WU preamble of the wake-up packet, an SA to be used for wake-up packets, and a DA to be used for wake-up packets. The WLAN TR of the second station WUR STA2 delivers the information obtained from the wake-up packet to the WURx.

Figure 10:
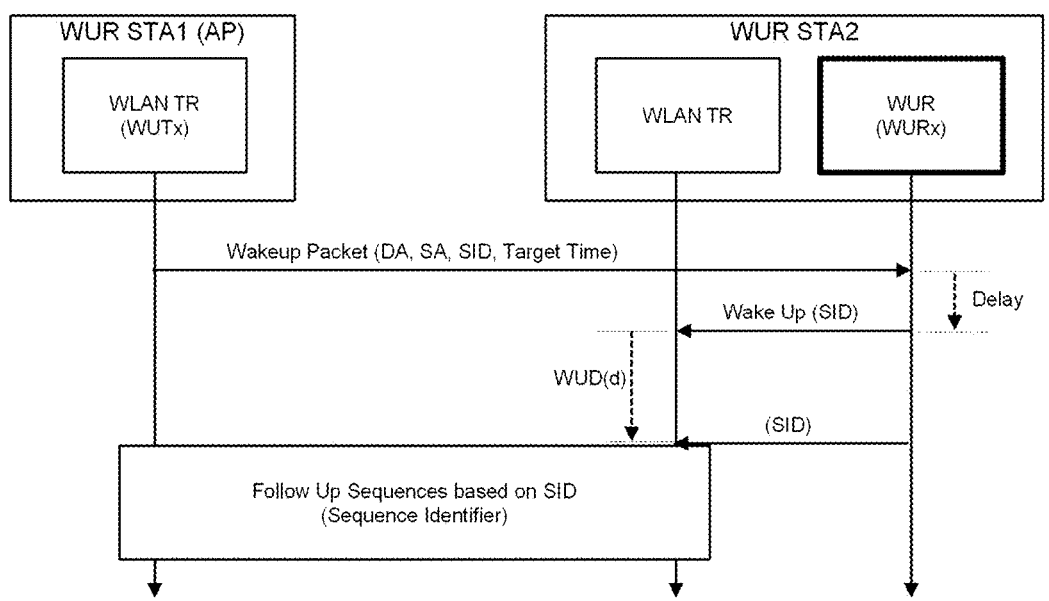
FIG. 10 shows an operation in which a wireless communication terminal supporting WUR-based power save wakes up based on a wake-up packet according to an embodiment of the present invention.

FIG. 10 shows an operation in which a wireless communication terminal supporting WUR-based power save wakes up based on a wake-up packet according to an embodiment of the present invention.

The wireless communication terminal including the WURx may wake up after an arbitrary time from when the wake-up packet is received. Specifically, the wireless communication terminal including the WURx may signal wake-up to the WLAN TR after an arbitrary time from when receiving the wake-up packet. In a specific embodiment, the wireless communication terminal including the WUTx may insert information on the wake-up target time into the wake-up packet. The wake-up target time may indicate the target time at which the WLAN TR should be switched to the wake-up state. The wireless communication terminal including the WURx may obtain information on the wake-up target time from the wake-up packet and may wake up at the wake-up target time. Further, the wireless communication terminal including the WUTx may insert information on the operation sequence after the wake-up into the wake-up packet. A wireless communication terminal including the WURx may obtain information on an operation sequence after wake-up from a wake-up packet and may determine a wake-up time based on information on the operation sequence after wake-up. The information on the operation sequence after the wake-up may be a SID that identifies the subsequent operation. Further, the wireless communication terminal including the WURx may determine the start time of the wake-up operation based on the time required for the wake-up of the WLAN TR described above. For example, a wireless communication terminal including the WURx may determine a wake-up time based on information on an operation sequence after a wake-up target time or wake-up, and may determine a time to signal the wake-up to the WURx based on the determined wake-up time and the time required to wake up of the WLAN TR.

In the embodiment of FIG. 10, a first station WUR STA1, which is an AP including the WUTx, transmits a wake-up packet to a second station WUR STA2 including the WURx. At this point, the wake-up packet may include information indicating a wake-up target time, an identifier SID that identifies an operation sequence after wake-up, an SA, and a DA. The second station WUR STA2 may determine the wake-up operation start time of the WLAN TR based on at least one of a wake-up target time and an identifier SID for identifying an operation sequence after wake-up. At this point, the second station WUR STA2 may determine the wake-up operation start time in consideration of the time WUD(d) required for wake-up of the WLAN TR. The WURx of the second station WUR STA2 signals wake-up to the WLAN TR at the determined wake-up operation start time. The WLAN TR of the second station WUR STA2 delivers the information obtained from the wake-up packet to the WURx. When signaling wake-up to the WLAN TR, the second station WUR STA2 may deliver information obtained from the wake-up packet to the WLAN TR. In yet another specific embodiment, after signaling wake-up to the WLAN TR, the second station WUR STA2 may deliver information obtained from the wake-up packet to the WLAN TR. The information may be at least one of information indicating a wake-up target time, an identifier SID that identifies an operation sequence after wake-up, an SA, and a DA. The WLAN TR operates based on an identifier that identifies an operation sequence after wake-up.

As described with reference to FIG. 6, the wireless communication terminal may wake up a plurality of wireless communication terminals using one wake-up packet. This will be described with reference to FIG. 11.

Figure 11:
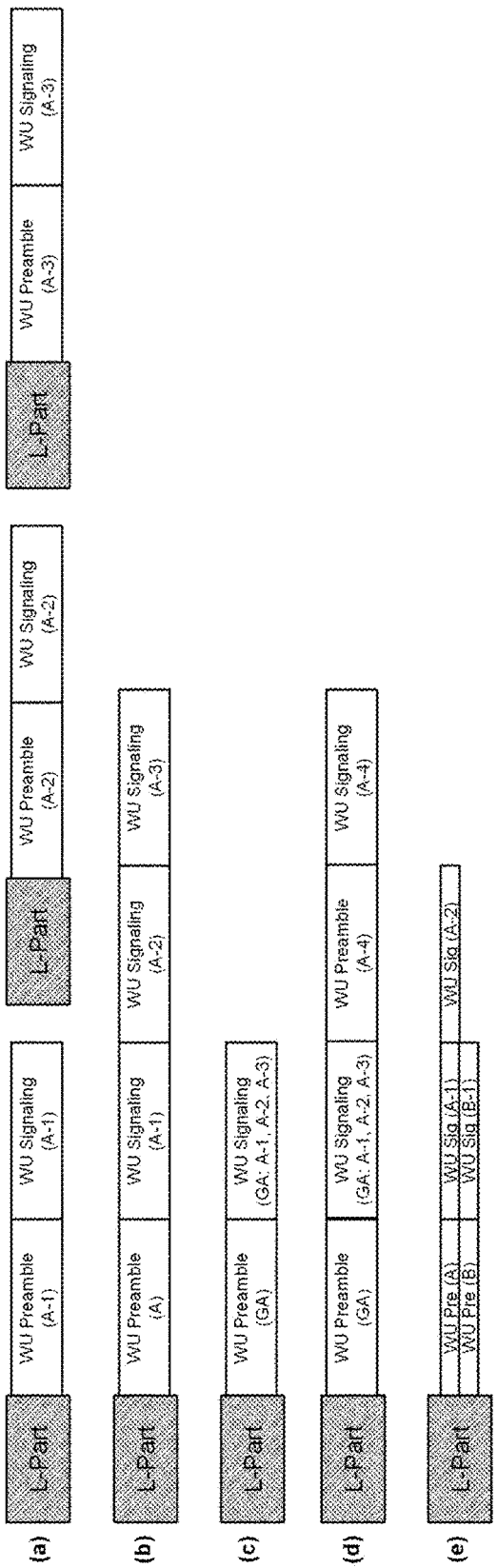
FIG. 11 shows a format of a wake-up packet according to an embodiment of the present invention.

FIG. 11 shows a format of a wake-up packet according to an embodiment of the present invention.

The wireless communication terminal including the WUTx may wake up a plurality of wireless communication terminals by transmitting a plurality of wake-up packets. Specifically, the wireless communication terminal including the WUTx may transmit a plurality of wake-up packets with a predetermined time interval. At this point, the WU preamble may include the above-described signal pattern sequence. In the embodiment of FIG. 11(*a*), the wireless communication terminal including the WUTx transmits a wake-up packet for waking up the first station A-1, and sequentially transmits a wake-up packet for waking up the second station A-2 and a wake-up packet for waking up the third station A-3 at a predetermined time interval.

Also, the wireless communication terminal including the WUTx may wake up a plurality of wireless communication terminals by transmitting one wake-up packet including a plurality of WU signaling fields. Specifically, each of the plurality of WU signaling fields may signal information on each of the plurality of wireless communication terminals. At this point, the wireless communication terminal receiving the wake-up packet may obtain the information on wake-up from the signaling field corresponding to the wireless communication terminal among the plurality of WU signaling fields. As described above, the WU preamble may include a signal pattern sequence. In addition, the signal pattern sequence may be a pattern identically applied to all wireless communication terminals supporting WUR-based power save. In another specific embodiment, the signal pattern sequence may be a pattern for identifying a wireless communication terminal of a BSS associated with a plurality of wireless communication terminals. Through this embodiment, the wireless communication terminal may reduce the overhead incurred due to the redundant transmission of the legacy part. In the embodiment of FIG. 11(*b*), the wireless communication terminal including the WUTx transmits a wake-up packet for waking up the first station A-1, the second station A-2, and the third station A-3. At this point, the WU preamble of the wake-up packet includes a signal pattern sequence for identifying the station of the BSS including the first station A-1, the second station A-2, and the third station A-3. Also, the wake-up packet includes a plurality of WU signaling fields for signaling information on each of the first station A-1, the second station A-2, and the third station A-3.

Also, the wireless communication terminal including the WUTx transmits one wake-up packet including one WU signaling field for signaling the wake-up information on the plurality of wireless communication terminals to wake-up the plurality of wireless communication terminals. The WU signaling field may include an identifier indicating a plurality of wireless communication terminals to wake up. The identifier indicating the plurality of wireless communication terminals to wake up may be a group address GA. In addition, the signal pattern sequence included in the WU preamble may be a pattern identically applied to all wireless communication terminals supporting WUR-based power save. In another specific embodiment, the signal pattern sequence may be a pattern for identifying a wireless communication terminal of a BSS associated with a plurality of wireless communication terminals. In yet another specific embodiment, the signal pattern sequence may be a pattern that a WU packet identifies a plurality of wireless communication terminals to wake up. In the embodiment of FIG. 11(*c*), the wireless communication terminal including the WUTx transmits a wake-up packet for waking up the first station A-1, the second station A-2, and the third station A-3. At this point, the WU preamble of the wake-up packet includes a signal pattern sequence for identifying the group including the first station A-1, the second station A-2, and the third station A-3. Also, the wake-up packet includes one WU signaling field for signaling information on each of the first station A-1, the second station A-2, and the third station A-3. Through this embodiment, the wireless communication terminal may prevent unnecessary wake-up packet reception of a wireless communication terminal other than the wireless communication terminals that the wake-up packet wakes up.

Also, the wireless communication terminal including the WUTx may transmit one wake-up packet that signals wake-up information on a plurality of grouping-possible wireless communication terminals as one WU signaling field to wake up the plurality of wireless communication terminals. For convenience of description, a WU signaling field for signaling wake-up information on a plurality of grouping-possible wireless communication terminals is referred to as a group WU signaling field. At this point, the wireless communication terminal including the WUTx may transmit a group WU signaling field and a WU preamble for the group WU signaling field together. In addition, the wireless communication terminal including the WUTx may signal the wake-up information on the wireless communication terminals that may not be grouped as a separate WU signaling field. At this point, the wireless communication terminal including the WUTx may transmit a WU preamble for an additional WU signaling field together with an additional WU signaling field. In the embodiment of FIG. 11(*d*), the wireless communication terminal including the WUTx transmits a wake-up packet for waking up the first station A-1, the second station A-2, the third station A-3, and the fourth station A-4. At this point, the first station A-1, the second station A-2, and the third station A-3 may be grouped into one group. The wake-up packet includes a WU preamble and a group WU signaling field for the first station A-1, the second station A-2, and the third station A-3, and includes a WU preamble and a WU signaling field for the fourth station A-4.

In addition, the wireless communication terminal including the WUTx may transmit the wake-up parts for the plurality of wireless communication terminals using different frequency bands. Specifically, a wireless communication terminal including the WUTx may transmit a plurality of WU signaling fields through different frequency bands. In a specific embodiment, a wireless communication terminal including the WUTx may transmit a plurality of WU signaling fields and a plurality of WU preambles through different frequency bands. At this point, the wireless communication terminal including the WUTx may use Orthogonal Frequency Division Multiple Access (OFDMA). In addition, the WU signaling field may be the group WU signaling field described above. In addition, the bandwidth of the frequency band in which the WU signaling field and the WU preamble are transmitted may be smaller than 20 MHz. In the example, the wireless communication terminal including the WUTx may signal the frequency band in which the WU preamble and the WU signaling field are transmitted before transmitting the wake-up packet. In addition, the frequency band in which the WU signaling field and the WU preamble are transmitted may be designated for each wireless communication terminal. In the embodiment of FIG. 11(*e*), the wireless communication terminal including the WUTx transmits a wake-up packet for waking up the first station A-1, the second station A-2, and the third station B-1. At this point, the wireless communication terminal including the WUTx transmits the first wake-up part for the first station A-1 and the second station A-2 through the first frequency band. Further, the wireless communication terminal including the WUTx transmits the second wake-up part for the third station B-1 through the second frequency band. The first wake-up part includes a WU preamble including a signal pattern sequence identifying the first station A-1 and the second station A-2, and includes a WU signaling field for signaling wake-up information on the first station A-1 and a WU signaling field for signaling wake-up information on the second station A-2. Also, the second wake-up part includes a WU preamble including a signal pattern sequence identifying the third station B-1 and a WU signaling field for signaling wake-up information on the third station B-1.

The operation of the wireless communication terminal according to the wake-up packet format will be described in detail with reference to FIGS. 12 to 16.

Figure 12:
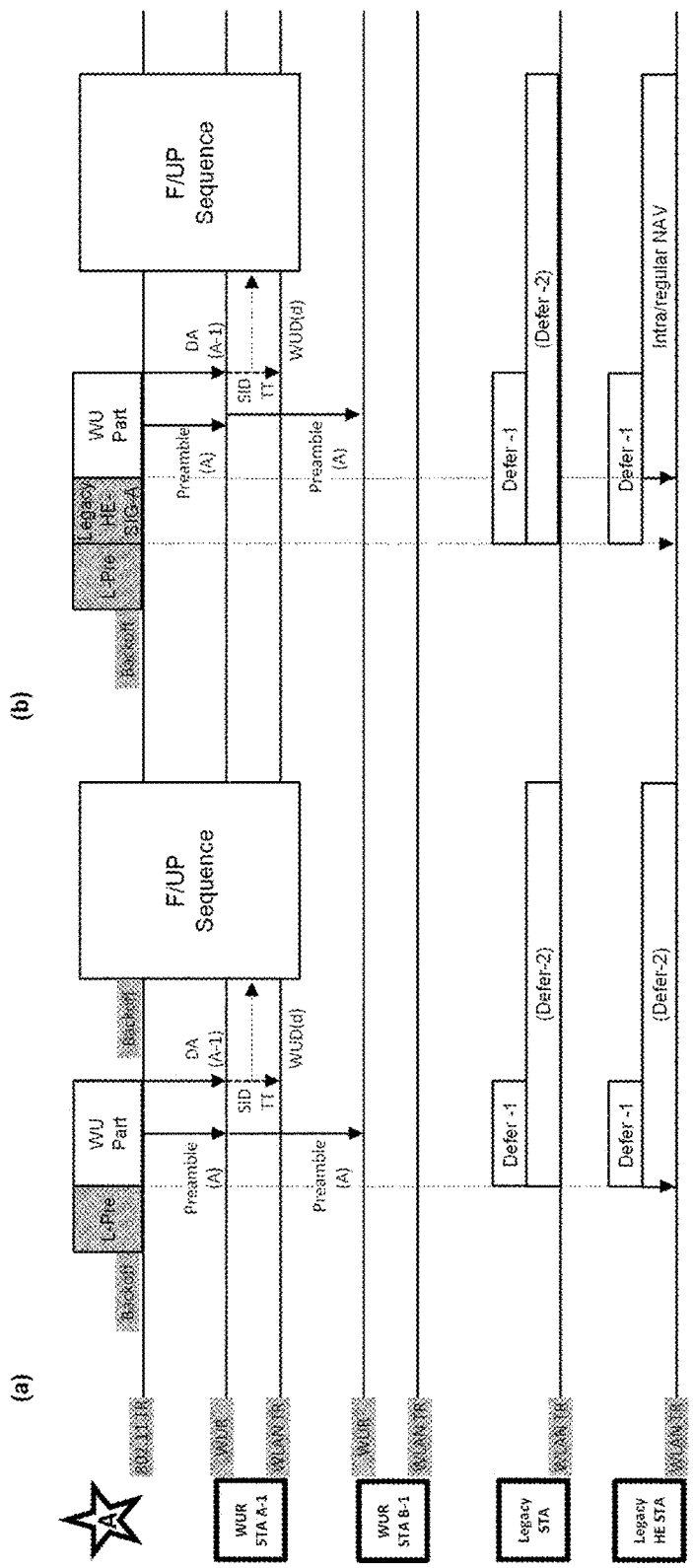
FIG. 12 shows an operation of a wireless communication terminal receiving a wake-up packet according to an embodiment of the present invention.

FIG. 12 shows an operation of a wireless communication terminal receiving a wake-up packet according to an embodiment of the present invention.

As described with reference to FIG. 8, FIG. 12(a) shows an operation in which the wireless communication terminal receives the wake-up packet when the legacy part of the wake-up packet includes the legacy preamble of the PPDU of the WLAN. The wireless communication terminal supporting the WUR-based power save mode may determine the receiver of the wake-up packet based on the WU preamble of the wake-up part of the wake-up packet. In the embodiment of FIG. 12(a), the first WUR station WUR STA A-1 and the second WUR station WUAR STA B-1 determines whether the signal pattern sequence included in the WU preamble of the wake-up part indicates the BSS including each of the first WUR station WUR STA A-1 and the second WUR station WUAR STA B-1. Since the signal pattern sequence included in the WU preamble indicates the BSS including the first WUR station WUR STA A-1, the first WUR station WUR STA A-1 continues to receive the wake-up packet, and the second WUR station WUAR STA B-1 stops receiving the wake-up packet. The first WUR station WUR STA A-1 obtains information on the wake-up operation from the WU signaling field of the wake-up part. Specifically, the first WUR station WUR STA A-1 obtains the DA of the wake-up packet from the WU signaling field. Since the DA of the wake-up packet is the first WUR station WUR STA A-1, the first WUR station WUR STA A-1 performs a wake-up operation. Specifically, the first WUR station WUR STA A-1 may obtain an identifier SID that identify an operation sequence and a wake-up target time TT after wake-up from the WU signaling field of the wake-up part. The first WUR station WUR STA A-1 performs a wake-up operation according to the obtained information. Specifically, the first WUR station WUR STA A-1 may wake up based on at least one of an identifier SID that identify an operation sequence after wake-up, a wake-up target time TT, and a wake-up requiring time WUD(d).

A legacy terminal that does not support WUR-based power save mode receives the legacy part of the wake-up packet. At this point, the legacy terminal defers channel access to the frequency band in which the wake-up packet is transmitted based on the L-Length field of the L-SIG field included in the legacy part. However, the legacy terminal determines that the PPDU is no longer transmitted from the wake-up part when the transmission ends and thus, the legacy terminal may suspend channel access defer for the frequency band in which the wake-up packet is transmitted and may access the frequency band in which the wake-up packet is transmitted.

As described with reference to FIG. 8, FIG. 12(b) shows an operation in which the wireless communication terminal receives the wake-up packet when the legacy part of the wake-up packet includes the legacy preamble of the PPDU of the WLAN and an additional OFDM symbol. Specifically, the legacy part of the wake-up packet may include a legacy preamble included in the PPDU of the WLAN and a non-legacy preamble included in the PPDU of the WLAN. At this point, the legacy part may include a part of the legacy preamble included in the PPDU of the WLAN and the non-legacy preamble included in the PPDU of the WLAN. In the embodiment of FIG. 12(b), the operation of the other wireless communication terminals is the same as that in the embodiment of FIG. 12(a). However, in the embodiment of FIG. 12(b), the legacy part includes the HE-SIG-A field. Therefore, a HE legacy station Legacy HE STA capable of decoding the HE-SIG-A among the legacy terminals sets the NAV based on the HE-SIG-A field. The wireless communication terminal including the WUTx may prevent the HE legacy station Legacy HE STA from accessing the frequency band in which the wake-up packet is transmitted while the wake-up packet is transmitted through this embodiment.

Figure 13:
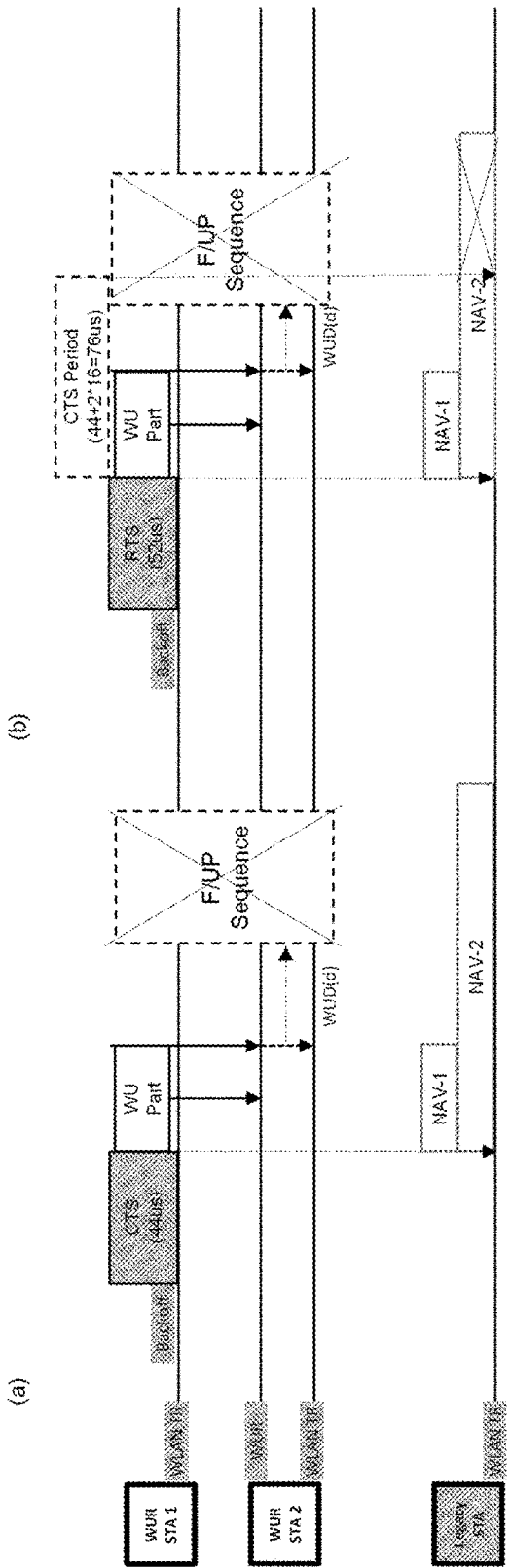
FIG. 13 shows an operation of a wireless communication terminal receiving a wake-up packet according to another embodiment of the present invention.

FIG. 13 shows an operation of a wireless communication terminal receiving a wake-up packet according to another embodiment of the present invention.

As described with reference to FIG. 8, FIG. 13(a) shows an operation in which the wireless communication terminal receives the wake-up packet when the legacy part of the wake-up packet includes a CTS frame. As described with reference to FIG. 8, FIG. 13(b) shows an operation in which the wireless communication terminal receives the wake-up packet when the legacy part of the wake-up packet includes an RTS frame. In the embodiments of FIGS. 13(a) and 13(b), the first WUR station WUR STA1 transmits a wake-up packet. The second WUR station WUR STA2 receives the wake-up packet from the first WUR station WUR STA1. At this point, the operation in which the second WUR station WUR STA2 receives the wake-up packet is the same as the operation described with reference to FIG. 12. However, in the embodiment of FIG. 13(a), the second WUR station WUR STA2 may not wake up because the second WUR station WUR STA2 may not normally receive the wake-up packet.

In the embodiment of FIG. 13(a), a legacy station Legacy STA sets a NAV based on a duration field of a CTS frame. In the embodiment of FIG. 13(b), a legacy station Legacy STA sets a NAV based on a duration field of an RTS frame. The Duration field of the CTS frame or the RTS frame may indicate the duration to the time point at which the transmission of the wake-up part ends or indicate the duration to the operation sequence end time point after wake-up. Since legacy station Legacy STA sets the NAV, even after the transmission of the legacy part of the wake-up packet, the legacy station Legacy STA does not access the frequency band in which the wake-up packet is transmitted. If the NAV is set based on the CTS frame, even if the second WUR station WUR STA2 wakes up and does not perform the subsequent operation, the legacy station Legacy STA does not release the NAV. If the NAV is set based on the RTS frame, even if the second WUR station WUR STA2 wakes up and does not perform the subsequent operation, the legacy station Legacy STA releases the NAV. This is because the wireless communication terminal receiving the RTS frame assumes that the CTS frame and the data frame are received within a predetermined time, and releases the NAV if no signal is received within a predetermined time.

Figure 14:
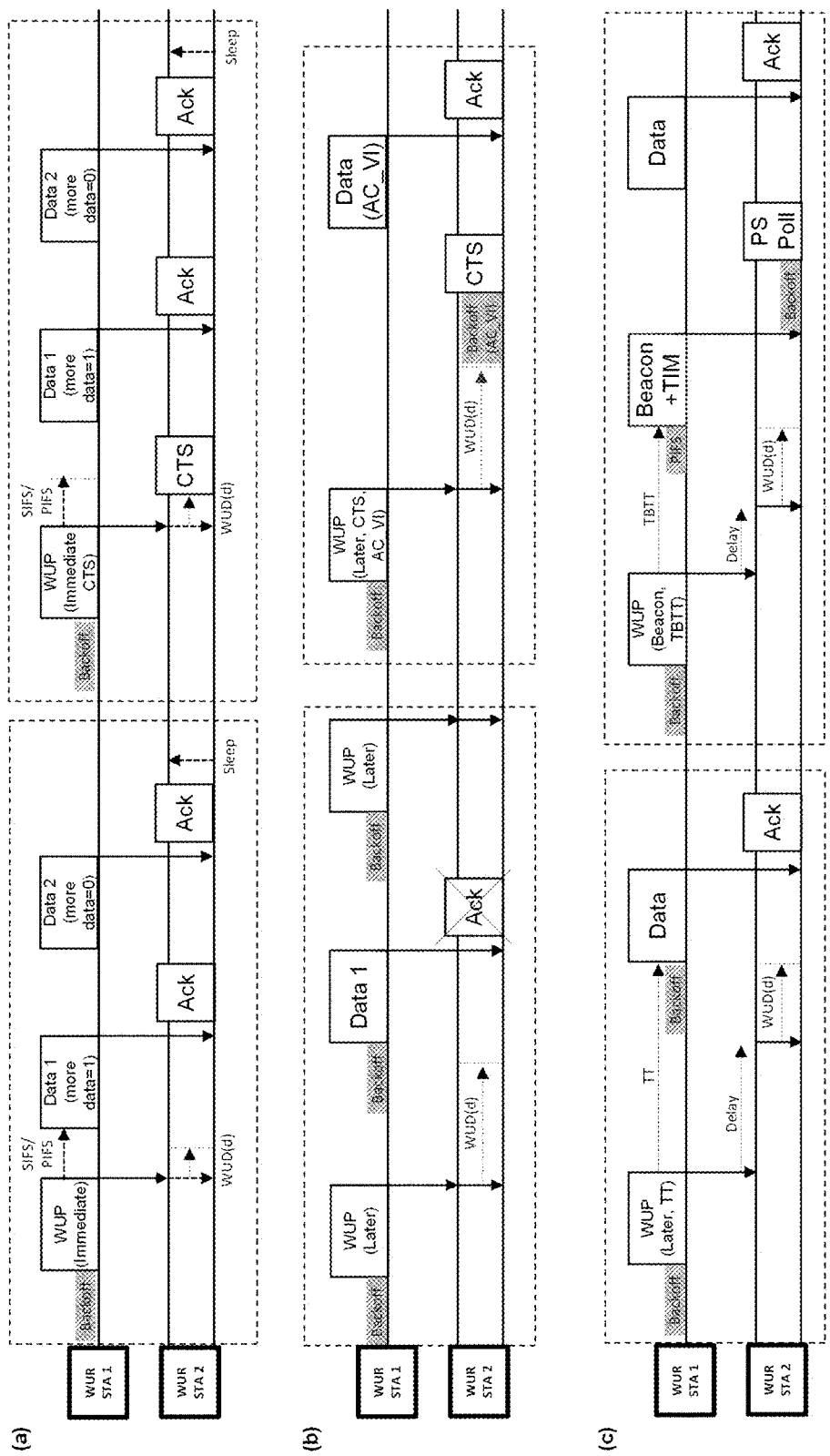
FIG. 14 shows that a wireless communication terminal according to an embodiment of the present invention performs a subsequent operation sequence after wake-up according to information represented by a wake-up packet.

FIG. 14 shows that a wireless communication terminal according to an embodiment of the present invention performs a subsequent operation sequence after wake-up according to information indicated by a wake-up packet.

As described above, a wireless communication terminal including the WURx may obtain information on a subsequent operation sequence from a wake-up packet. In addition, the wireless communication terminal including the WURx may determine the wake-up time point and the operation after wake-up according to the information on the obtained subsequent operation sequence. According to a specific embodiment, a wireless communication terminal including the WUTx may signal information related to the start time of a subsequent operation sequence. In addition, the wireless communication terminal including the WURx may start a subsequent operation sequence based on information related to the start time of the subsequent operation sequence. Specifically, a wireless communication terminal including the WUTx may signal an immediate subsequent operation sequence to a wireless communication terminal including the WURx using a wake-up packet. At this point, the immediate subsequent operation sequence indicates a subsequent operation sequence in which the operation starts within a predetermined time from when the transmission of the wake-up packet is completed within the TXOP in which the wake-up packet is transmitted. The wireless communication terminal including the WUTx may determine a starting time point of a subsequent operation sequence based on information on a capability of the wireless communication terminal including the WURx. Specifically, the wireless communication terminal including the WUTx may determine a starting time point of a subsequent operation sequence based on a time required for the wireless communication terminal including the WURx to wake up. In a specific embodiment, if the time required for the wireless communication terminal including WURx to wake up is smaller than a predetermined time, the wireless communication terminal including the WUTx may signal the immediate subsequent operation sequence to the wireless communication terminal including the WUTx. Also, the predetermined time of the immediate subsequent operation sequence may be a short inter-frame space (SIFS). Also, the predetermined time of the immediate subsequent operation sequence may be the time between SIFS and PCF Inter-Frame Space (PIFS).

In the embodiment of FIG. 14(*a*), the first WUR station WUR STA1 transmits a wake-up packet WUP signaling an immediate subsequent operation sequence to the second WUR station WUR STA2. At this point, the first WUR station WUR STA1 may determine whether the time WUD (d) required for the second WUR station WUR STA2 to wake up is shorter than SIFS or PIFS, and may transmit a wake-up packet WUP signaling an immediate subsequent operation sequence to the second WUR station WUR STA2. In the first embodiment of FIG. 14(*a*), the first WUR station WUR STA1 transmits the first data frame to the second WUR station WUR STA2 within SIFS or PIFS from when transmitting the wake-up packet WUP to the second WUR station WUR STA2. The second WUR station WUR STA2 receives the first data frame and transmits an ACK frame for the first data frame to the first WUR station STA1. The first WUR station WUR STA1 transmits the second data frame to the second WUR station WUR STA2 within SIFS or PIFS from when the ACK frame is received from the second WUR station WUR STA2. The second WUR station WUR STA2 receives the second data frame and transmits an ACK frame for the second data frame to the first WUR station STA1. The second WUR station WUR STA2 again enters the WUR-based power save mode. In such a manner, the wireless communication terminal including the WURx may enter the WUR-based power save mode after completing the subsequent operation sequence. Further, in the second embodiment of FIG. 14(*a*), the second WUR station WUR STA2 receives a wake-up packet WUP from the first WUR station WUR STA1. The second WUR station WUR STA2 transmits the CTS frame to the first WUR station WUR STA1 within SIFS or PIFS from when the wake-up packet WUP is received. Then, the first WUR station WUR STA1 transmits the first data frame and the second data frame to the second WUR station WUR STA2. At this point, the operations of the first WUR station WUR STA1 and the second WUR station WUR STA2 are the same as those described in the first embodiment of FIG. 14(*a*).

A wireless communication terminal including the WUTx may signal a not-immediate subsequent operation sequence to a wireless communication terminal including the WURx using a wake-up packet. At this point, the not-immediate subsequent operation sequence indicates a subsequent operation sequence in which the operation starts after a predetermined time from when the transmission of the wake-up packet is completed within a TXOP different from the TXOP in which the wake-up packet is transmitted. If the time required for the wireless communication terminal including WURx to wake up is smaller than a predetermined time, the wireless communication terminal including the WUTx may signal the not-immediate subsequent operation sequence to the wireless communication terminal including the WUTx. At this point, as described above, the predetermined time may be a Short Inter-Frame Space (SIFS). Also, the predetermined time may be the time between SIFS and PCF Inter-Frame Space (PIFS). In relation to the not-immediate subsequent sequence, a subsequent operation sequence proceeds within the new TXOP. Therefore, a wireless communication terminal that starts a subsequent operation sequence must obtain a TXOP through a backoff procedure. At this point, the wireless communication terminal that starts the subsequent operation sequence may perform the backoff procedure based on the priority of the data to be transmitted in the subsequent operation sequence. Even when a wireless communication terminal receiving data in a subsequent operation sequence starts a subsequent operation sequence, the backoff procedure may be performed based on the priority of data to be transmitted in a subsequent operation sequence. The priority of the data may indicate an access class. In a specific embodiment, the access class indicates a QoS class, and the QoS class may be divided into VO, VI, BE, and BK.

In the embodiment of FIG. 14(*b*), the first WUR station WUR STA1 transmits a wake-up packet WUP signaling a not-immediate subsequent operation sequence to the second WUR station WUR STA2. At this point, the first WUR station WUR STA1 may determine whether the time WUD (d) required for the second WUR station WUR STA2 to wake up is shorter than SIFS or PIFS, and may transmit a wake-up packet WUP signaling a not-immediate subsequent operation sequence to the second WUR station WUR STA2. In the first embodiment of FIG. 14 (b), the first WUR station WUR STA1 performs the backoff procedure after a longer time than SIFS or PIFS from when transmitting the wake-up packet WUP to the second WUR station WUR STA2. The first WUR station WUR STA1 obtains the TXOP through the backoff procedure and transmits the first data frame to the second WUR station WUR STA2 within the obtained TXOP. At this point, the second WUR station WUR STA2 does not receive the first data frame. Accordingly, the second WUR station WUR STA2 may not transmit the ACK frame for the first data frame to the first WUR station STA1. The first WUR station WUR STA1 not receiving the ACK frame transmits the wake-up packet WUP again. Specifically, the first WUR station WUR STA1 obtains the TXOP again through the backoff procedure and transmits the wake-up packet WUP to the second WUR station WUR STA2 within the obtained TXOP. The operation of the wireless communication terminal not receiving the ACK frame again to transmit the wake-up packet will be described in detail with reference to FIG. 25.

In the second embodiment of FIG. 14(*b*), the second WUR station WUR STA2 receives a wake-up packet WUP from the first WUR station WUR STA1. The second WUR station WUR STA2 performs the back-off procedure after a longer time than the SIFS or PIFS from when receiving the wake-up packet WUP. The second WUR station WUR STA2 obtains the TXOP through the backoff procedure and transmits the CTS frame to the first WUR station WUR STA1 within the obtained TXOP. At this point, the second WUR station WUR STA2 performs the backoff procedure based on AC_VI, which is the access class of the data frame to be transmitted by the first WUR station WUR STA1. Thereafter, the first WUR station WUR STA1 transmits a first data frame whose an access class is AC_VI to the second WUR station WUR STA2. At this point, the operations of the first WUR station WUR STA1 and the second WUR station WUR STA2 are the same as those described in the first embodiment of FIG. 14(b).

A wireless communication terminal including the WUTx may signal a subsequent operation sequence starting at a designated target time TT to a wireless communication terminal including the WURx using a wake-up packet. Specifically, a wireless communication terminal including the WUTx may signal a target time at which a subsequent operation sequence starts to a wireless communication terminal including the WURx using a wake-up packet. At this point, the target time may indicate a target beacon transmit time (TBTT), which indicates a time at which the beacon frame is transmitted. The beacon frame may include a traffic indication map (TIM) indicating that data to be transmitted to a wireless communication terminal including WURx is buffered. The wireless communication terminal including the WUTx may transmit data through a power Save (PS)—Poll frame or a separate subsequent sequence. At this point, the subsequent operation sequence starting at the designated target time may indicate a subsequent operation sequence in which the operation starts at a designated time in the TXOP different from the TXOP in which the wake-up packet is transmitted. If the time required for the wireless communication terminal including WURx to wake up is smaller than a predetermined time, the wireless communication terminal including the WUTx may signal a subsequent operation sequence starting at a target time to the wireless communication terminal including the WUTx. At this point, as described above, the predetermined time may be a Short Inter-Frame Space (SIFS). Also, the predetermined time may be the time between SIFS and PCF Inter-Frame Space (PIFS). The wireless communication terminal including WURx may wake up the WLAN TR based on the target time indicated by the wake-up packet. The wireless communication terminal including WURx may wake up the WLAN TR after an arbitrary time from when receiving the wake-up packet. Specifically, the wireless communication terminal including WURx may determine the time to wake up the WLAN TR based on the target time indicated by the wake-up packet and the time required for wake-up. As in the embodiment of a wireless communication terminal that starts a not-immediate subsequent operation sequence, a wireless communication terminal that starts a subsequent operation sequence may perform a backoff procedure based on a priority of data to be transmitted in a subsequent operation sequence. Even when a wireless communication terminal receiving data in a subsequent operation sequence starts a subsequent operation sequence, the backoff procedure may be performed based on the priority of data to be transmitted in a subsequent operation sequence. The priority of the data may indicate an access class. In a specific embodiment, the access class indicates a QoS class, and the QoS class may be divided into VO, VI, BE, and BK. In another specific embodiment, a wireless communication terminal including the WUTx may sense whether a frequency band to be used in a subsequent operation sequence is idle for a predetermined time without a backoff procedure. When the corresponding frequency band is idle for a predetermined time, the wireless communication terminal including the WUTx may proceed with a subsequent operation sequence through the corresponding frequency band. At this point, the predetermined time may be a PIFS.

In the embodiment of FIG. 14(c), the first WUR station WUR STA1 transmits a wake-up packet WUP signaling a subsequent operation sequence starting at the designated target time TT to the second WUR station WUR STA2. Specifically, the wake-up packet WUP may include a target time TT at which a subsequent operation sequence starts. The second WUR station WUR STA2 wakes up the WLAN TR based on the target time TT indicated by the wake-up packet. Specifically, as described above, the second WUR station WUR STA2 determines the time to wake up the WLAN TR in consideration of the target time TT indicated by the wake-up packet and the time WUD(d) required for wake-up. Thus, the second WUR station WUR STA2 may wake up the WLAN TR after an arbitrary time from when receiving the wake-up packet. In the first embodiment of FIG. 14(c), the first WUR station WUR STA1 performs a backoff procedure. The first WUR station WUR STA1 obtains the TXOP through the backoff procedure and transmits the data frame to the second WUR station WUR STA2 at the designated target time TT within the obtained TXOP. At this point, the second WUR station WUR STA2 receives the data frame. The second WUR station WUR STA2 transmits the ACK frame for the data frame to the first WUR station STA1. In the second embodiment of FIG. 14(c), the second WUR station WUR STA2 receives a wake-up packet WUP from the first WUR station WUR STA1. At this point, the wake-up packet WUP indicates the time TBTT at which the beacon is transmitted. The first WUR station WUR STA1 determines whether the frequency band to transmit the beacon frame is idle during PIFS. If the corresponding frequency band is idle for PIFS, the first WUR station WUR STA1 transmits a beacon frame. At this point, the beacon frame includes the TIM. The second WUR station WUR STA2 obtains the TXOP through the backoff procedure and transmits the PS Poll frame within the obtained TXOP. The first WUR station WUR STA1 receiving the PS Poll frame transmits a data frame to the second WUR station WUR STA2 based on the PS Poll frame. The second WUR station WUR STA2 transmits the ACK frame for the data frame to the first WUR station WUR STA1. The wireless communication terminal including the WURx may secure more time to stay in the WUR-based power save mode through these embodiments.

Figure 15:
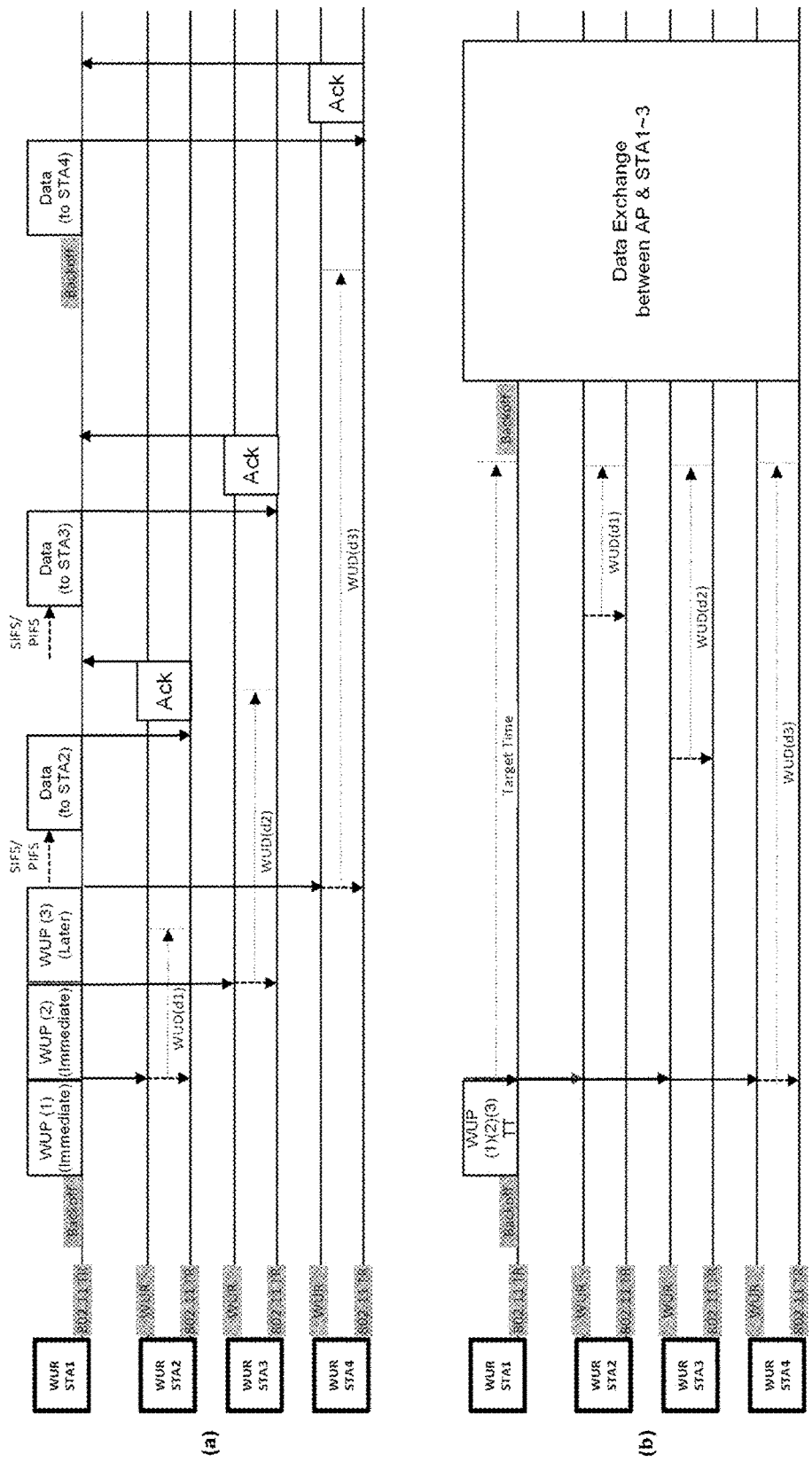
FIG. 15 shows that a plurality of wireless communication terminals according to an embodiment of the present invention perform a subsequent operation sequence after wake-up according to information represented by a wake-up packet.

FIG. 15 shows that a plurality of wireless communication terminals according to an embodiment of the present invention perform a subsequent operation sequence after wake-up according to information indicated by a wake-up packet.

As described above, the wake-up packet may include wake-up information on a plurality of wireless communication terminals. At this point, the subsequent operation sequence start time of each of the plurality of wireless communication terminals may be set based on the completion of the previous operation among the subsequent operation sequences for the plurality of wireless communication terminals. It is assumed that the wireless communication terminal including the WRTx transmits a wake-up packet to the first wireless communication terminal and the second wireless communication terminal, and the start time of the subsequent operation sequence for the first wireless communication terminal is faster than the start time of the subsequent operation sequence for the second wireless communication terminal. At this point, the first wireless communication terminal may determine the start time of the subsequent operation sequence based on the time when the wake-up packet is transmitted. Also, the second wireless communication terminal may determine the start time of the subsequent operation sequence based on the time when the subsequent operation sequence for the first wireless communication terminal ends. Further, when the wireless communication terminal including the WUTx instructs the plurality of wireless communication terminals to wake up, the wireless communication terminal including the WUTx may designate the start time of the operation sequence for the wireless communication terminal having the longest time to wake up as the latest time among the start time of the operation sequences for the plurality of wireless communication terminals. In the embodiment of FIG. 15(a), the first WUR station WUR STA1 transmits a wake-up packet to the second WUR station WUR STA2, the third WUR station WUR STA3, and the fourth WUR station WUR STA4. At this point, the first WUR station WUR STA1 instructs a subsequent operation sequence to the second WUR station WUR STA2 through the wake-up packet. Further, the first WUR station WUR STA1 instructs the immediate subsequent operation sequence to the third WUR station WUR STA3 through the wake-up packet. Further, the first WUR station WUR STA1 instructs the not-immediate subsequent operation sequence to the fourth WUR station WUR STA4 through the wake-up packet. The first WUR station WUR STA1 transmits a data frame to the second WUR station WUR STA2 within SIFS or PIFS from when the wake-up packet transmission is completed. Specifically, the first WUR station WUR STA1 transmits a data frame to the second WUR station WUR STA2 within SIFS or PIFS from when the last wake-up packet transmission is completed. Therefore, even if the time WUD(d) required for WLAN TR of the second WUR station WUR STA2 to wake up is longer than SIFS or PIFS, the first WUR station WUR STA1 may instruct a subsequent operation sequence. In addition, the first WUR station WUR STA1 receives an ACK frame from the second WUR station WUR STA2 and transmits a data frame to the third WUR station WUR STA3 within SIFS or PIFS from when receiving the ACK frame. The third WUR station WUR STA3 transmits the ACK frame for the data frame to the first WUR station WUR STA1. In addition, the first WUR station WUR STA1 receives an ACK frame from the third WUR station WUR STA3 and transmits a data frame to the fourth WUR station WUR STA4 after a longer time than SIFS or PIFS from when receiving the ACK frame. The fourth WUR station WUR STA4 transmits the ACK frame for the data frame to the first WUR station WUR STA1.

Also, the wireless communication terminal including the WUTx may determine a subsequent operation sequence start time for the plurality of wireless communication terminals based on the wireless communication terminal that takes the longest time to wake-up among the plurality of wireless communication terminals. Specifically, when the wireless communication terminal including the WUTx transmits data to a plurality of wireless communication terminals simultaneously through a subsequent operation after wake-up, the wireless communication terminal including the WUTx may determine a start time of a subsequent operation sequence for a plurality of wireless communication terminals based on a wake-up requiring time of a wireless communication terminal that takes a longest time to wake-up among a plurality of wireless communication terminals. For example, the wireless communication terminal including the WUTx may set a target time of a subsequent operation sequence for a plurality of wireless communication terminals to which the wake-up packet is signaled based on a wake-up requiring time of a wireless communication terminal that takes a longest time to wake-up among a plurality of wireless communication terminals. At this, the wireless communication terminal including the WUTx may designate, as a target time of a subsequent operation sequence for a plurality of wireless communication terminals signaled by the wake-up packet, a time after a time elapse by a wake-up requiring time of a wireless communication terminal that requires the longest time to wake-up among a plurality of wireless communication terminals from the completion time of the wake-up packet transmission of the plurality of wireless communication terminals.

In the embodiment of FIG. 15(b), the first WUR station WUR STA1 transmits a wake-up packet WUP signaling wake-up information for the second WUR station WUR STA2, the third WUR station WUR STA3, and the fourth WUR station WUR STA4. The wake-up requiring time WUD(d3) of the fourth WUR station WUR STA4 is longer than the wake-up requiring time WUD(d1) of the second WUR station WUR STA2 and the wake-up requiring time WUD(d2) of the third WUR station WUR STA3. Thus, the first WUR station WUR STA1 may designate the target time TT of the subsequent operation sequence signaled by the wake-up packet WUP based on the wake-up requiring time WUD(d3) of the fourth WUR station WUR STA4. Specifically, the first WUR station WUR STA1 designates the time after the wake-up requiring time WUD(d3) of the fourth WUR station WUR STA4 elapses from the time when the transmission of the wake-up packet WUP is completed, as the target time TT of the subsequent operation sequence signaled by the wake-up packet WUP. The first WUR station WUR STA1 starts a backoff procedure for access to the frequency band used for data transmission at the target time. The first WUR station WUR STA1 transmits data to the second WUR station WUR STA2, the third WUR station WUR STA3, and the fourth WUR station WUR STA4 through the TXOP obtained through the backoff procedure.

Figure 16:
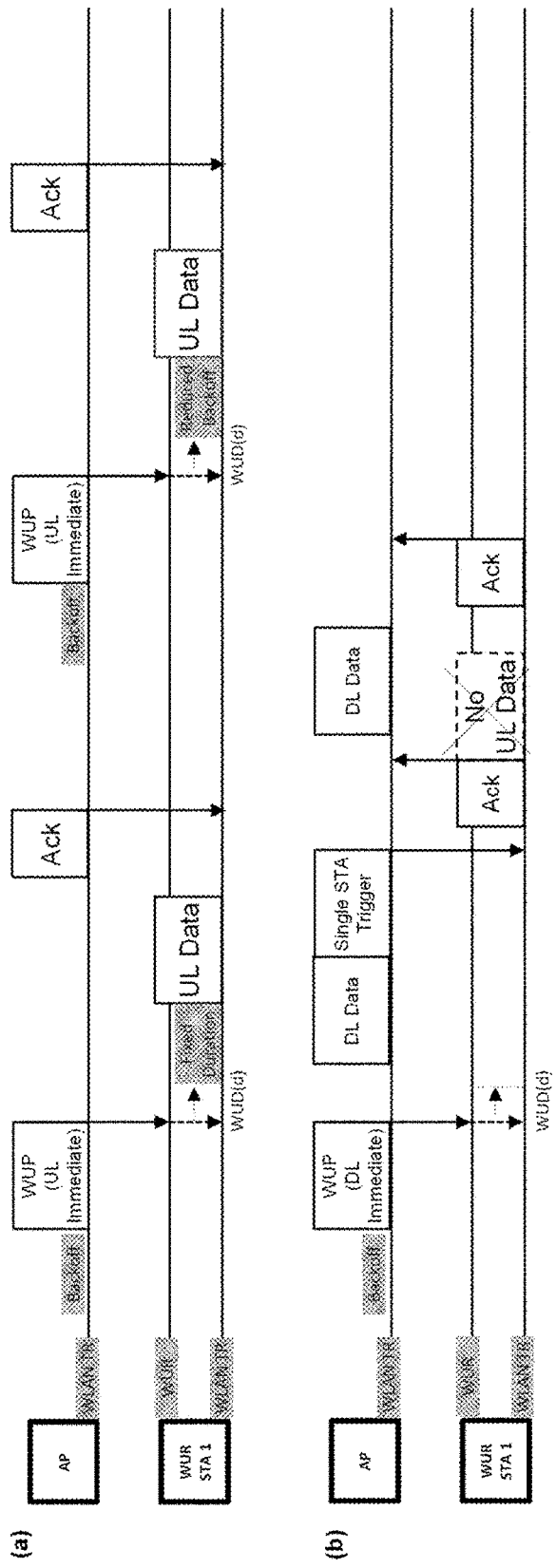
FIG. 16 shows that a wireless communication terminal according to an embodiment of the present invention performs an uplink (UL) transmission after wake-up according to information indicated by a wake-up packet.

FIG. 16 shows that a wireless communication terminal according to an embodiment of the present invention performs an uplink (UL) transmission after wake-up according to information indicated by a wake-up packet.

When the wake-up packet indicates UL transmission, the wireless communication terminal including the WURx may sense whether the frequency band to be used for UL transmission is idle for a predetermined time. If the corresponding frequency band is idle for a predetermined time, the wireless communication terminal including the WURx may proceed with a subsequent operation sequence through the corresponding frequency band. In yet another specific embodiment, if the wake-up packet indicates UL transmission, a wireless communication terminal including WURx may perform a backoff procedure for a period shorter than a backoff period used in a general channel access in a frequency band to be used for UL transmission. Since the wireless communication terminal including the WUTx performs the backoff procedure to transmit the wake-up packet, the channel may be accessed only by a simplified procedure than the procedure used in general channel access, as in the above-described embodiments.

In the embodiment of FIG. 16(a), the AP transmits a wake-up packet WUP signaling the immediate operation sequence to the first WUR station WUR STA1. At this point, the wake-up packet includes information triggering the UL transmission. The first WUR station WUR STA1 accesses the channel to be used in the UL transmission after PIFS or SIFS from when the wake-up packet is transmitted. In the first embodiment of FIG. 16(a), the first WUR station WUR STA1 senses a channel to be used for UL transmission for a predetermined time. When the channel to be used for UL transmission is idle for a predetermined time, the first WUR station WUR STA1 transmits a data frame to the AP. The AP transmits an ACK frame for the data frame to the first WUR station WUR STA1. In the second embodiment of FIG. 16(a), the first WUR station WUR STA1 performs a simplified backoff procedure on the channel to be used for UL transmission. When the first WUR station WUR STA1 obtains the TXOP through the simplified backoff procedure, the first WUR station WUR STA1 transmits the data frame to the AP. The AP transmits an ACK frame for the data frame to the first WUR station WUR STA1.

In addition, the wireless communication terminal including the WUTx may transmit information triggering UL transmission together with the downlink data frame. At this point, the trigger information may be abbreviated information as compared with the trigger information triggering UL transmission of a plurality of wireless communication terminals. Specifically, the triggering information may be information that triggers only the UL transmission of one wireless communication terminal. In addition, the wireless communication terminal including the WURx may perform UL transmission based on the triggering information. At this point, the wireless communication terminal including the WURx may perform UL transmission based on the length of the PPDU indicated by the triggering information. In addition, the wireless communication terminal including the WURx may perform UL transmission based on the MCS indicated by the triggering information. In addition, the wireless communication terminal including the WURx may perform UL transmission based on the information on a resource allocation indicated by the triggering information. At this point, the information on the resource allocation may indicate the frequency band to be used in the UL transmission. If there is no uplink data to be transmitted by the wireless communication terminal including the WURx, the wireless communication terminal including the WURx may ignore the triggering information. If there is no uplink data to be transmitted by the wireless communication terminal including the WURx, the wireless communication terminal including the WURx may transmit an ACK frame for a downlink data frame.

In the embodiment of FIG. 16(b), the AP transmits a wake-up packet WUP signaling the immediate operation sequence to the first WUR station WUR STA1. The AP transmits a data frame to the first WUR station WUR STA1 after PIFS or SIFS from when the wake-up packet is transmitted. At this point, the AP may transmit the data frame together with the trigger information triggering the UL transmission of the first WUR station WUR STA1. At this point, as described above, the trigger information may be abbreviated information as compared with the trigger information triggering UL transmission of a plurality of wireless communication terminals. Since there is no uplink data to be transmitted by the first WUR station WUR STA1, the first WUR station WUR STA1 ignores the triggering information. The first WUR station WUR STA1 transmits an ACK frame for the downlink data frame to the AP. The AP transmits the downlink data frame again to the first WUR station WUR STA1. The first WUR station WUR STA1 transmits an ACK frame for the downlink data frame to the AP.

In the WLAN, the AP periodically transmits a beacon frame. Therefore, the wireless communication terminal located close to the AP may receive the beacon frame. The wireless communication terminal receiving the beacon frame may obtain information on the BSS operated by the AP from the beacon frame. In addition, the wireless communication terminal receiving the beacon frame may detect whether the wireless communication terminal is in the coverage of the AP through the beacon frame. In addition, the wireless communication terminal receiving the beacon frame may detect the new BSS through the beacon frame. When the wireless communication terminal enters the WUR-based power save mode, the wireless communication terminal is not capable of receiving the beacon frame. Therefore, there is a need for a method that enables the wireless communication terminal entering the WUR-based power saving mode to obtain information on the AP or to detect whether the wireless communication terminal is within the coverage of the AP. This will be described with reference to FIGS. 17 to 21.

Figure 17:
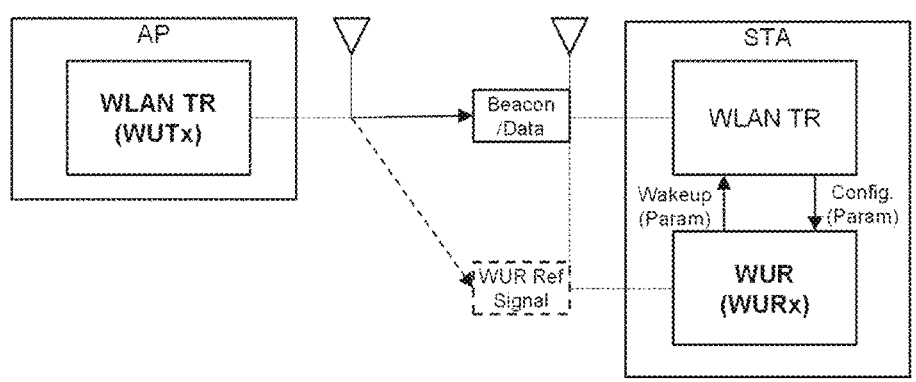
FIG. 17 shows that a wireless communication terminal detects a WUR reference signal according to an embodiment of the present invention.

FIG. 17 shows that a wireless communication terminal detects a WUR reference signal according to an embodiment of the present invention.

When the wireless communication terminal including the WURx may not receive a wake-up packet for a predetermined time, the wireless communication terminal including the WURx may wake up the WLAN TR. At this point, the wake-up packet may include a wake-up of a BSS including the wireless communication terminal including the WURx as well as the wake-up packet transmitted from another BSS. In addition, if the wireless communication terminal including the WURx receives the beacon frame after waking up the WLAN TR, the wireless communication terminal including the WURx may enter the WUR-based power save mode again. Through this, the wireless communication terminal including the WURx may determine whether the wireless communication terminal including the WURx is in the coverage of the wireless communication terminal including the WUTx. In this embodiment, the wireless communication terminal including the WURx may repeat unnecessary wake-up.

The wireless communication terminal including the WUTx may periodically transmit a WUR reference signal. At this point, the wireless communication terminal including the WUTx may transmit the WUR reference signal together with other signaling information. In addition, the WUR reference signal may include less signaling information than the wake-up packet. When the wireless communication terminal including the WURx may not receive a WUR reference signal for a predetermined time, the wireless communication terminal including the WURx may wake up the WLAN TR. In FIG. 17, the AP including the WUTx periodically transmits a WUR reference signal as well as a beacon frame. At this point, the station including WURx wakes up the WLAN TR when the station including WURx may not receive the WUR reference signal for a predetermined period.

Depending on the transmission coverage of the WUR signal and the transmission coverage of the WLAN signal, the necessity of whether the wireless communication terminal including the WURx wakes up the WLAN TR may be changed. Specifically, when the transmission coverage of the WUR signal is similar to that of the WLAN signal, the wireless communication terminal including the WURx may not receive the WLAN signal even if the wireless communication terminal including the WURx wakes up the WLAN TR because the wireless communication terminal including the WURx does not receive the WUR reference signal. Also, if the coverage of the WLAN signal is greater than the coverage of the WUR signal, the wireless communication terminal including the WURx may not receive a WUR reference signal so that the wireless communication terminal including the WURx receives a WLAN signal when the wireless communication terminal including the WURx wakes up the WLAN TR. This will be described with reference to FIG. 18.

Figure 18:
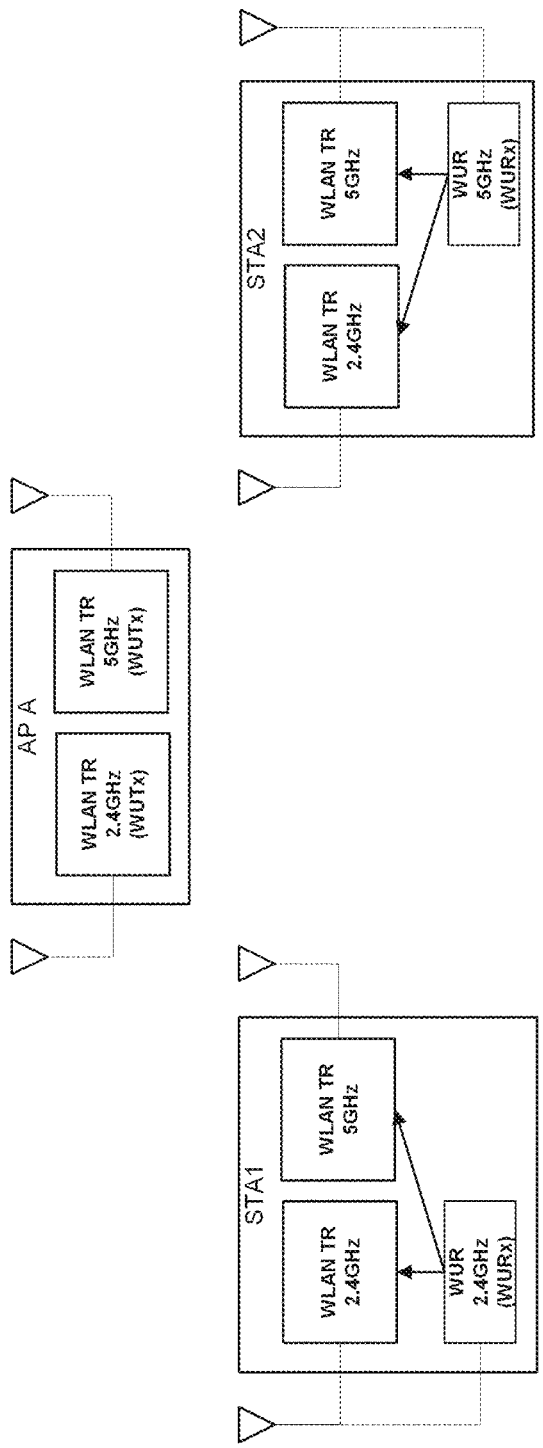
FIG. 18 shows a case where a wireless communication terminal according to an embodiment of the present invention transmits a WUR signal and a WLAN signal through different frequency bands.

FIG. 18 shows a case where a wireless communication terminal according to an embodiment of the present invention transmits a WUR signal and a WLAN signal through different frequency bands.

Whether to transmit the WLAN signal after the WUR signal is transmitted or transmit only the WLAN signal may be different depending on whether the wireless communication terminal including WURx enters the WUR-based power save mode. Accordingly, there is a need for a method for the wireless communication terminal including the WUTx to determine whether the wireless communication terminal including the WURx enters a WUR-based power save mode.

When the wireless communication terminal including the WURx enters a WUR-based power save mode, the wireless communication terminal including the WURx may signal a WUR-based power save mode entry to the wireless communication terminal including the WUTx. Also, in a case where there is an agreement between the wireless communication terminal including the WURx and the wireless communication terminal including the WUTx, when the wireless communication terminal including the WURx enters a WUR-based power save mode, the wireless communication terminal including the WURx may not transmit additional signaling information to the wireless communication terminal including the WUTx. The wireless communication terminal including the WURx may periodically enter a WUR-based power save mode. At this point, the wireless communication terminal including the WURx may signal to the wireless communication terminal including the WUTx that the wireless communication terminal including the WURx enters the WUR-based power save mode periodically. The period in which the wireless communication terminal including the WURx enters the WUR-based power save mode may be set through the agreement with the wireless communication terminal including the WUTx.

The wireless communication terminal includes a plurality of WLAN TRs, and each of the plurality of WLAN TRs may operate in different frequency bands. Specifically, the wireless communication terminal may include a WLAN TR operating in the 2.4 GHz band and a WLAN TR operating in the 5 GHz band. At this point, the wireless communication terminal may perform WLAN communication using at least one of the plurality of WLAN TRs. Specifically, the wireless communication terminal may simultaneously operate a plurality of BSSs in a plurality of bands using a plurality of WLAN TRs. In addition, the wireless communication terminal may transmit the WUR using at least one of the plurality of WLAN TRs. The wireless communication terminal including the WURx may support only one of a plurality of bands that the WLAN TR may use. In the embodiment of FIG. 18, the AP includes a WLAN TR supporting the 2.4 GHz band and a WLAN TR supporting the 5 GHz band. In addition, the AP may transmit the WUR signal in the 2.4 GHz band and the WUR signal in the 5 GHz band. The first station STA1 includes a WLAN TR supporting the 2.4 GHz band and a WLAN TR supporting the 5 GHz band but includes only the WURx supporting the 2.4 GHz band. In addition, the second station STA2 includes a WLAN TR supporting the 2.4 GHz band and a WLAN TR supporting the 5 GHz band but includes only the WURx supporting the 5 GHz band. At this point, the characteristic of the wireless signal varies in each band, so that the coverage of the wireless signal for each band may be different. Therefore, the wireless communication terminal is required to operate in consideration of the bandwidth supported by the WURx, and the difference between the coverage of the WLAN signal and the coverage of the WUR signal.

The wireless communication terminal including the WUTx may transmit the WUR signal in a band different from the band in which the WLAN signal is transmitted. Also, the wireless communication terminal including the WURx may receive the WUR signal using a band different from the band used by the WLAN TR entering the power save mode. Specifically, the wireless communication terminal including the WURx may signal whether to support a WUR-based power save operation to the wireless communication terminal including the WUTx. At this point, the wireless communication terminal including the WURx may signal to the wireless communication terminal including the WUTx a band in which the wireless communication terminal including the WURx may receive the WUR signal. Also, the wireless communication terminal including the WUTx may signal whether the wake-up packet transmission is possible to the wireless communication terminal including the WURx. At this point, the wireless communication terminal including the WUTx may signal to the wireless communication terminal including the WURx whether the wake-up packet may be transmitted in a band different from the band for transmitting the WLAN signal. Also, the wireless communication terminal including the WUTx may signal the transmission address to be used when transmitting the wake-up packet to the wireless communication terminal including the WURx. Also, the wireless communication terminal including the WUTx may signal the information on a frequency band to be used when transmitting the wake-up packet to the wireless communication terminal including the WURx. The information on the frequency band to be used when transmitting the wake-up packet may indicate the primary channel of the band, not the band in which the WLAN signal is transmitted.

If the propagation characteristics of the WUR signal are better than the propagation characteristics of the WLAN signal, the coverage of the WUR signal may be greater than the coverage of the WLAN signal. When the propagation characteristic of the WUR signal is better than the propagation characteristic of the WLAN signal and the reception signal strength indicator (RSSI) of the last WUR reference signal received by the wireless communication terminal including the WURx is equal to or smaller than a predetermined magnitude, the wireless communication terminal including the WURx may not wake up the WLAN TR even when the wireless communication terminal including the WURx may not receive the WUR reference signal for a predetermined period. This is because there is a high possibility that communication with the wireless communication terminal including the WUTx may not be performed even if waking up the WLAN TR.

If the propagation characteristic of the WUR signal is worse than the propagation characteristic of the WLAN signal, and if a WUR reference signal including the WURx is not received for a predetermined period, the wireless communication terminal including the WURx may wake up the WLAN TR. At this point, the wireless communication terminal including the WURx may signal the wireless communication terminal including the WUTx that the wireless communication terminal including the WURx is out of coverage of the WUR signal using the WLAN TR. In addition, when the wireless communication terminal including the WURx again enters the coverage of the WUR signal, the wireless communication terminal including the WURx may signal the wireless communication terminal including the WUTx that the wireless communication terminal including the WURx enters the coverage of the WUR signal using the WLAN TR.

Figure 19:
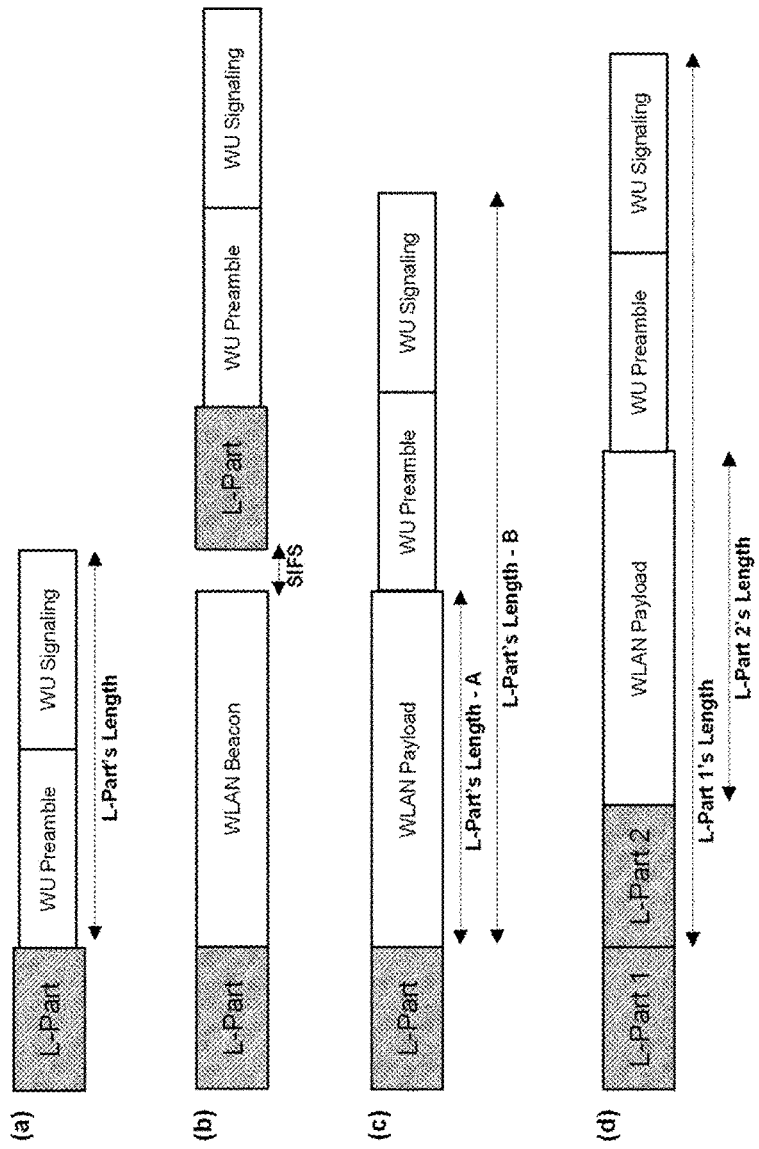
FIG. 19 shows a method of transmitting a WUR reference signal by a wireless communication terminal according to an embodiment of the present invention.

FIG. 19 shows a method of transmitting a WUR reference signal by a wireless communication terminal according to an embodiment of the present invention.

The wireless communication terminal including the WUTx may transmit the WUR reference signal in the same form as the wake-up packet. As described above, the wake-up packet may be divided into a legacy part, a WU preamble part, and a WU signaling part. Specifically, the wake-up packet may be the same as that in the embodiment of FIG. 19(a). In addition, the WU preamble part may include a signal pattern indicating that it is a WUR reference signal. At this point, the wireless communication terminal including the WURx may identify the WUR reference signal based on the WU preamble part. In a specific embodiment, the WUR reference signal may not include the WU signaling part. For example, if the WU preamble part includes a signal pattern indicating a WUR reference signal, the WUR reference signal may not include a WU signaling part. In another specific embodiment, the WUR reference signal may include the WU signaling part. At this point, the WU signaling part may include a transmitter address. At this point, the transmitter address may be BBSID or an abbreviated identifier corresponding to the BBSID. For example, the transmitter address may be either a BSS color or a partial BSS color. The WU signaling part may include a receiver address. At this point, if the receiver address indicates a broadcast address, the receiver address may be indicated by a predetermined indicator. When the wireless communication terminal including the WUTx uses the WUR signal transmission band and the WLAN signal transmission band, which are different, the wireless communication terminal including the WUTx may insert information on the band used for WUR signal transmission into the WU signaling part.

The wireless communication terminal including the WUTx may transmit a WUR reference signal together with a WLAN frame. Specifically, the wireless communication terminal including the WUTx may transmit a beacon frame and transmit a WUR reference signal after a predetermined time from when transmitting a beacon frame. At this point, the predetermined time may be an SIFS. At this point, the wireless communication terminal including the WUTx may transmit the WUR reference signal without a separate channel access procedure for transmitting the WUR reference signal. Specifically, the wireless communication terminal including the WUTx may transmit the WUR reference signal as in the embodiment of FIG. 19(b).

In another specific embodiment, the wireless communication terminal including the WUTx may transmit a WUR reference signal after the WLAN frame. At this point, the L-Length field of the L-SIG of the PPDU including the WLAN frame may indicate the length L-Part's Length-A of the corresponding PPDU. In another specific embodiment, the L-Length field of the L-SIG of the PPDU including the WLAN frame may indicate the length L-Part's Length-B obtained by adding the WUR reference signal to the corresponding PPDU. At this point, the duration of the WUR reference signal may be PIFS or less. If the duration of the WUR reference signal is greater than PIFS, this is because the legacy wireless communication terminal may access the frequency band in which the WUR reference signal is transmitted. Specifically, the wireless communication terminal including the WUTx may transmit the WUR reference signal as in the embodiment of FIG. 19(c). In this embodiment, the wireless communication terminal including the WUTx may transmit a WUR reference signal without waiting for a separate legacy part and a WUR reference signal transmission.

In another specific embodiment, the wireless communication terminal including the WUTx may insert a plurality of legacy parts into a PPDU including a WLAN frame and transmit a WUR reference signal after the WLAN frame. Specifically, the wireless communication terminal including the WUTx may insert two legacy parts into a PPDU including a WLAN frame. At this point, the L-Length field of the L-SIG included in the first legacy part L-Part 1 may indicate the length L-Part 1's Length obtained by adding the WUR reference signal to the PPDU including the WLAN frame. In addition, The L-Length field of the L-SIG included in the second legacy part L-Part 2 may indicate the length L-Part 2's Length of the PPDU including the WLAN frame. Even if the legacy wireless communication terminal may only decode the first legacy part, the legacy wireless communication terminal does not access the frequency band in which the WUR reference signal is transmitted while the WUR reference signal is transmitted based on the L-Length field of the L-SIG included in the first legacy part. In addition, a wireless communication terminal capable of decoding both the first legacy part and the second legacy part may estimate the length of the WLAN frame and obtain the WLAN frame.

The description of the WUR reference signal transmission and format described with reference to FIG. 19 may be similarly applied to the wake-up packet.

Figure 20:
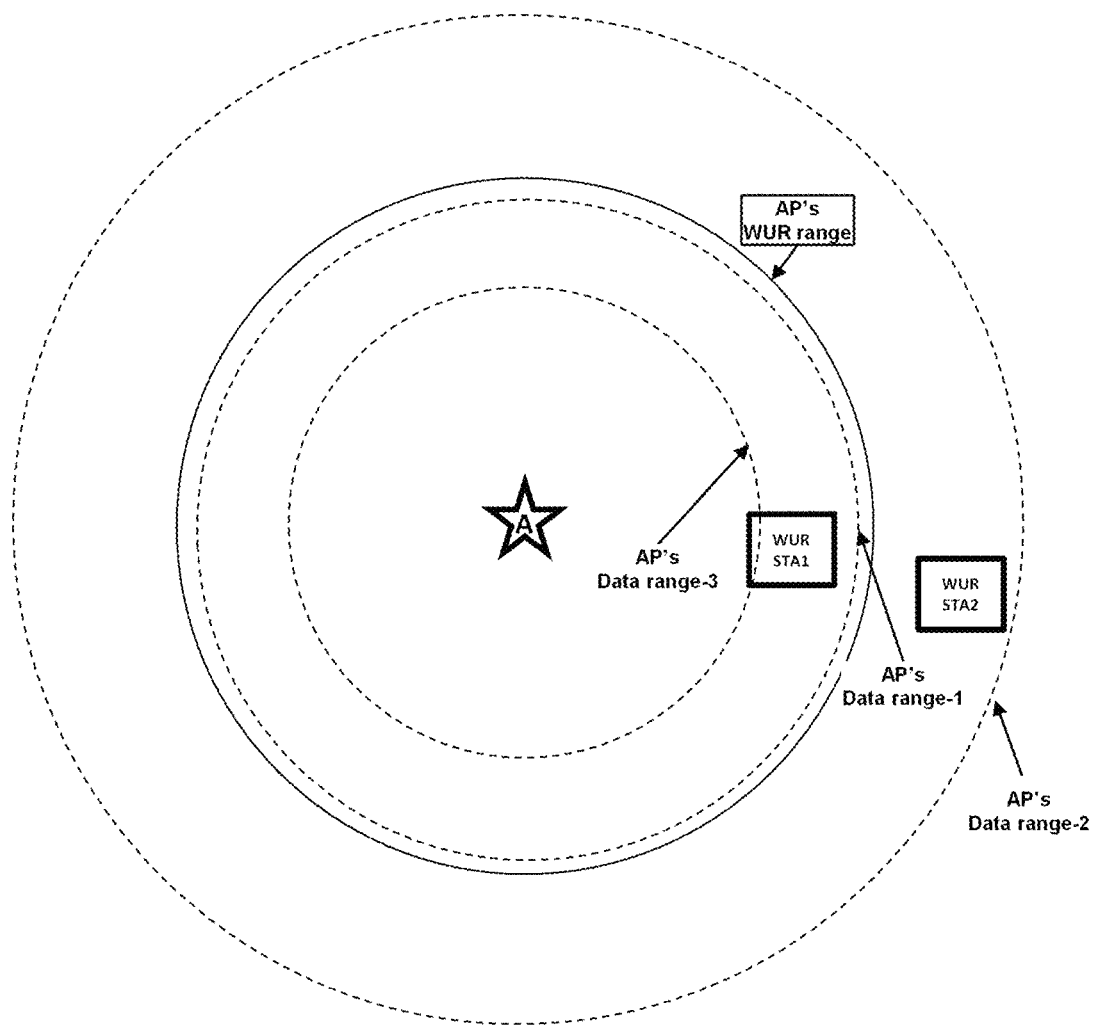
FIG. 20 shows a method for a wireless communication terminal according to an embodiment of the present invention to determine the coverage of a WUR signal based on a WUR reference signal.

FIG. 20 shows a method for a wireless communication terminal according to an embodiment of the present invention to determine the coverage of a WUR signal based on a WUR reference signal.

The wireless communication terminal including the WUTx may transmit a WUR reference signal. Specifically, the wireless communication terminal including the WUTx may periodically transmit a WUR reference signal. In another specific embodiment, the wireless communication terminal including the WUTx may transmit a WUR reference signal as required.

The wireless communication terminal including the WURx may stop the WUR-based power save mode according to the RSSI of the WUR reference signal. Specifically, when the RSSI of the WUR reference signal is smaller than a predetermined magnitude, the wireless communication terminal including the WURx may stop the WUR-based power save mode. When the RSSI of the WUR reference signal is smaller than a predetermined magnitude, the wireless communication terminal including the WURx may wake up the WLAN TR. At this point, the predetermined magnitude may be set by the WLAN TR. If the RSSI is low, since the wireless communication terminal including the WURx is located at the end of the WUR signal transmission coverage transmitted by the wireless communication terminal including the WUTx or is interfered with the surrounding wireless signal, the wireless communication terminal including the WURx may not receive a wake-up packet. At this point, the wireless communication terminal including the WURx may remain in the WUR-based power save mode, and this may be prevented by the embodiments described above.

When the wireless communication terminal including the WURx may not receive a WUR reference signal for a predetermined time, the wireless communication terminal including the WURx may stop the WUR-based power save mode. Specifically, when the wireless communication terminal including the WURx may not receive a WUR reference signal for a predetermined time, the wireless communication terminal including the WURx may wake up the WLAN TR. At this point, the predetermined time may be a time longer than the period in which the wireless communication terminal including the WUTx transmits the WUR reference signal. Specifically, the predetermined time may be a time that is several times longer than the period in which the wireless communication terminal including the WUTx transmits the WUR reference signal.

In the above-described embodiments, when the wireless communication terminal including the WURx wakes-up the WLAN TR, the wireless communication terminal including the WURx may deliver the type of a wake-up to the WLAN TR. Specifically, when the wireless communication terminal including the WURx wakes up the WLAN TR, the wireless communication terminal including the WURx may transmit to the WLAN TR the message that the WUR signal is lost. In a specific embodiment, when the wireless communication terminal including the WURx wakes up the WLAN TR, the wireless communication terminal including the WURx may transmit a message that the WUR signal is lost to the WLAN TR through the transmission parameter.

As described above, the operation of the wireless communication terminal including the WURx may vary depending on the difference between the coverage of the WUR signal and the coverage of the WLAN signal. Specifically, if the coverage of the WUR signal and the coverage of the WLAN signal are the same, the wireless communication terminal including the WURx may not stop the WUR-based power saving mode even when a problem occurs in receiving the WUR reference signal. At this point, the predetermined condition may be at least one of the case where the WUR reference signal is not received for a predetermined time or more and the case where the magnitude of the WUR reference signal is less than a predetermined magnitude. This is because if it is out of the coverage of the WUR signal, it is out of coverage of the WLAN signal, so that there is a high possibility that it is difficult to resume communication with the AP even if the wireless communication terminal including the WURx wakes up the WLAN TR. The wireless communication terminal including the WURx may determine the difference between the coverage of the WUR signal and the coverage of the WLAN signal based on the band used by the WUR signal and the band used by the WLAN signal. Specifically, when the WUR signal and the WLAN signal use the same band, the wireless communication terminal including the WURx may determine that the coverage of the WUR signal and the coverage of the WLAN signal are the same.

Also, if the coverage of the WUR signal is less than the coverage of the WLAN signal, the wireless communication terminal including the WURx may stop the WUR-based power saving mode when the WUR reference signal is not received for a predetermined time or longer. At this point, as described above, the predetermined time may be a time longer than the period in which the wireless communication terminal including the WUTx transmits the WUR reference signal. This is because even if it is out of the coverage of the WUR signal, it may not be out of the coverage of the WLAN signal, so that there is a high possibility that it may resume communication with the AP as the wireless communication terminal including the WURx wakes up the WLAN TR.

Also, if the coverage of the WUR signal is greater than the coverage of the WLAN signal, the wireless communication terminal including the WURx may stop the WUR-based power save mode when the RSSI of the WUR reference signal is smaller than a predetermined magnitude. As described above, the predetermined magnitude may be set by the WLAN TR. Even if it is not out of the coverage of the WLAN signal, it may be out of the coverage of the WLAN signal, so that the wireless communication terminal including the WURx may wake up the WLAN TR even though it may receive the WUR signal.

The wireless communication terminal including the WURx may detect the BSS through the WUR signal. A wireless communication terminal not associated with any BSS may detect a new BSS through a WUR signal. Also, a wireless communication terminal associated with any one BSS may be associated with a new BSS based on the WUR signal. This will be described with reference to FIGS. 21 to 22.

Figure 21:
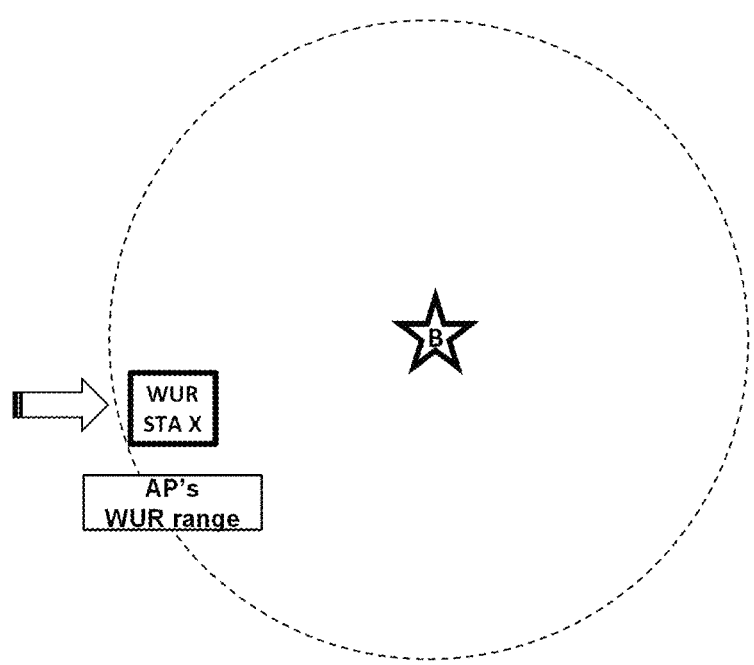
FIG. 21 shows that a wireless communication terminal detects a new BBS using a WUR reference signal according to an embodiment of the present invention.
Figure 22:
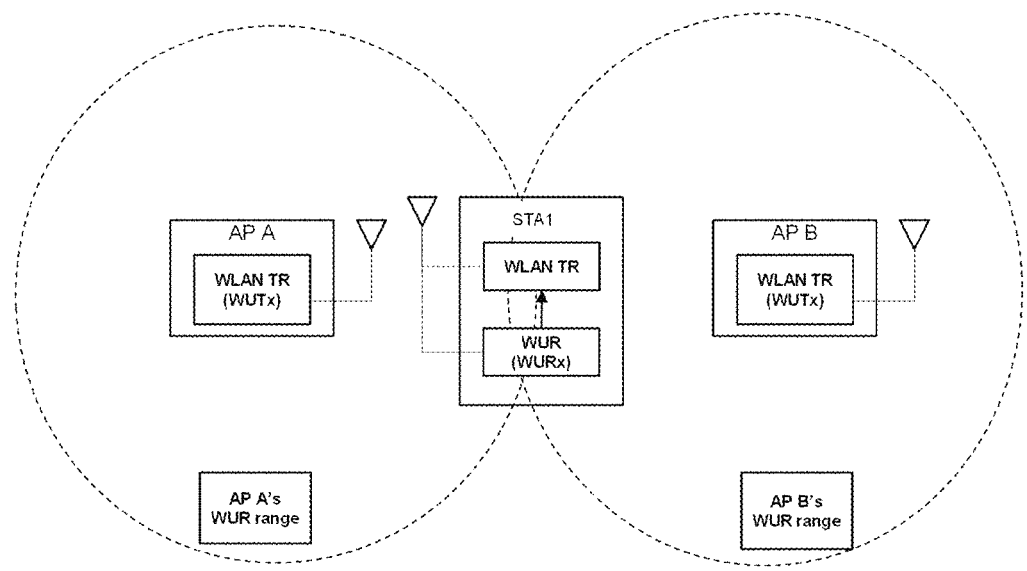
FIG. 22 shows that a wireless communication terminal according to an embodiment of the present invention performs a BSS handover operation using a WUR reference signal.

FIG. 21 shows that a wireless communication terminal detects a new BBS using a WUR reference signal according to an embodiment of the present invention. FIG. 22 shows that a wireless communication terminal according to an embodiment of the present invention performs a BSS handover operation using a WUR reference signal.

When the wireless communication terminal including the WURx receives a WUR signal not transmitted from a BSS associated with the wireless communication terminal including the WURx, the wireless communication terminal including WURx may stop the WUR-based power save mode. Specifically, the wireless communication terminal including the WURx, which is not associated with any one BSS, may detect the WUR signal by changing the frequency channel according to the designated band and channel order in the WUR-based power save mode. At this point, the wireless communication terminal including the WURx may receive the WUR signal not transmitted from the BSS associated with the wireless communication terminal including the WURx. Furthermore, when the wireless communication terminal including the WURx receives a WUR signal not transmitted from a BSS associated with the wireless communication terminal including the WURx, the wireless communication terminal including WURx may stop the WUR-based power save mode.

The WUR signal may be the above-described WUR reference signal. In addition, the WUR signal may be a wake-up packet. Stopping the WUR-based power save mode by the wireless communication terminal including the WURx may indicate that the wireless communication terminal including the WURx wakes up the WLAN TR. At this point, the WURx may transmit information related to the WUR signal detected to the WLAN TR. Specifically, the WURx may transmit the transmitter address to the WLAN TR. In yet another specific embodiment, the WURx may deliver the RSSI of the received WUR signal to the WLAN TR.

The wireless communication terminal including the WURx may determine whether to stop the WUR-based power save mode based on whether the transmitter address of the WUR signal transmitted from the BSS associated with the wireless communication terminal including the WURx corresponds to the designated address. Specifically, when the transmitter address of the WUR signal received by the wireless communication terminal including the WURx corresponds to the designated address, the wireless communication terminal including the WURx may stop the WUR-based power save mode. At this point, the designated address may be the address specified by the WLAN TR. Specifically, the designated address may be an AP including a WUTx among a plurality of APs accessed by the WLAN TR. In a specific embodiment, the designated address may be an AP that transmits a WUR reference signal among a plurality of APs accessed by the WLAN TR.

In addition, the wireless communication terminal including the WURx may determine whether to stop the WUR-based power save mode based on the information on the transmission coverage indicated by the WUR signal transmitted from the BSS not associated with the wireless communication terminal including the WURx. At this point, the information on the transmission coverage may indicate information on the band used for WLAN signal transmission and the band used for WUR signal transmission. Specifically, the information on the transmission coverage may indicate whether the band used for WLAN signal transmission is identical to the band used for WUR signal transmission. In addition, the information on the transmission coverage may indicate information on the size of the transmission coverage of the WLAN signal and the size of the WUR transmission coverage. Specifically, the information on the transmission coverage may indicate the relationship between the size of the transmission coverage of the WLAN signal and the size of the WUR transmission coverage. For example, information on the transmission coverage may indicate whether the transmission coverage of the WLAN signal is greater than the WUR transmission coverage, or whether the transmission coverage of the WLAN signal is equal to the WUR transmission coverage.

In addition, the wireless communication terminal including the WURx may determine whether to stop the WUR-based power save mode based on the information on the transmission coverage indicated by the WUR signal transmitted from the BSS not associated with the wireless communication terminal including the WURx and the RSSI of the WUR signal. Also, if the coverage of the WUR signal is narrower than the transmission coverage of the WLAN signal, the wireless communication terminal including the WURx may stop the WUR-based power save mode regardless of the RSSI of the WUR signal. Also, if the coverage of the WUR signal is wider than the transmission coverage of the WLAN signal, the wireless communication terminal including the WURx may stop the WUR-based power save mode when the RSSI of the WUR signal is greater than a predetermined magnitude. The wireless communication terminal including the WURx may increase the possibility of communication with the AP operating the newly detected BSS through this embodiment.

Also, the wireless communication terminal including the WUTx may omit the receiver address of the WUR signal, or set it as a broadcast address, and transmit the wake-up packet. At this point, the wireless communication terminal including the WUTx may wait for the reception of the response frame for a predetermined time in the channel transmitting the wake-up packet. At this point, the response frame may be at least one of a beacon frame and a probe response frame. In addition, when the wireless communication terminal including the WUTx does not receive the response frame for a predetermined time, the wireless communication terminal including the WUTx may transmit the WUR signal in the other channel In the embodiment of FIG. 21, the WUR station WUR STA X enters the WUR signal transmission coverage of the AP B. At this point, the WUR station WUR STA X detects the WUR signal based on the frequency band according to the designated band and channel order. When the WUR station WUR STA X detects the WUR signal, the WUR station WUR STA X wakes up the WLAN TR. The WUR station WUR STA X may start the link setup procedure with the AP B using the wake-up WLAN TR.

In the embodiment of FIG. 22, a first station STA1 including the WURx is associated with a first AP AP A. When the first station STA1 enters the WUR signal transmission coverage of the second AP AP B, the first station STA1 may receive the WUR signal from the second AP AP B. When the first station STA1 receives a WUR signal from a second AP AP B not associated with the first station STA1, the first station STA1 may wake up the WLAN TR. At this point, the first station STA1 may determine whether to wake up the WLAN TR based on the address of the predetermined AP. Also, the first station STA1 may determine whether to wake up the WLAN TR based on information on the WUR signal transmission coverage indicated by the WUR signal. Also, the first station STA1 may determine whether to wake up the WURx based on the information on the transmission coverage of the WUR signal indicated by the WUR signal and the RSSI of the WUR signal.

The wireless communication terminal including the WURx may detect the BSS around the wireless communication terminal at low power without using the WLAN TR through these embodiments. In addition, the wireless communication terminal including the WURx may perform handover to a new BSS at low power through these embodiments.

Figure 23:
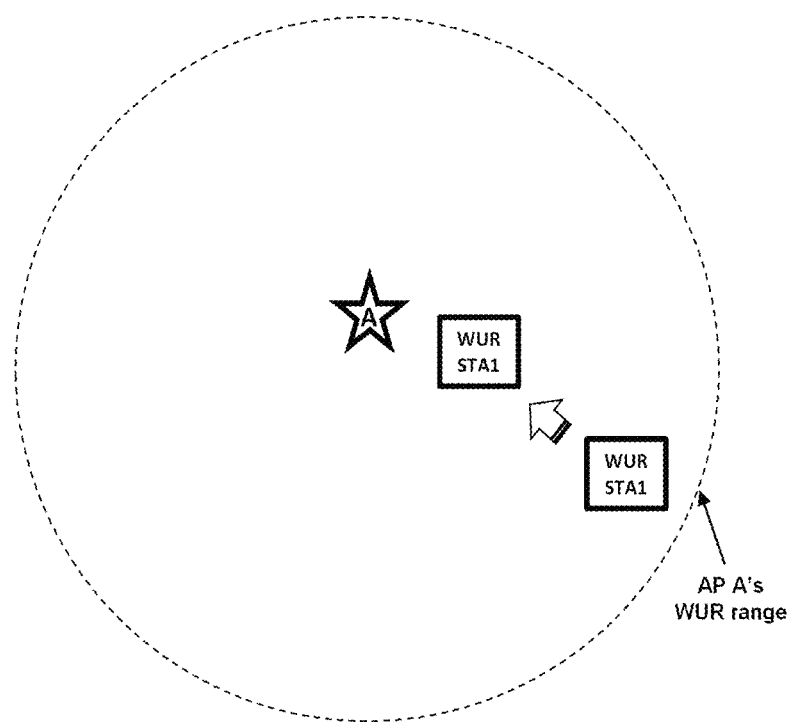
FIG. 23 shows an operation in which the wireless communication terminal according to the embodiment of the present invention adjusts the reception sensitivity of the WUR signal.

FIG. 23 shows an operation in which the wireless communication terminal according to the embodiment of the present invention adjusts the reception sensitivity of the WUR signal.

The wireless communication terminal including the WURx may adjust the WUR signal reception sensitivity (RX sensitivity) based on the RSSI of the WUR signal. Specifically, when the RSSI of the WUR signal is larger than a predetermined reference, the wireless communication terminal including the WURx may increase the WUR signal RX sensitivity. For example, the wireless communication terminal including the WURx may set the WUR signal RX sensitivity to −62 dBm. In order to keep the RX sensitivity of the WUR signal low, the wireless communication terminal must consume a lot of power in RF reception and baseband processing. When the RSSI of the WUR signal is high, it may be determined that the reception of the WUR signal is smooth in the future. Therefore, the wireless communication terminal including the WURx may reduce power consumption through such operation. In addition, when the RSSI of the WUR signal is lower than a predetermined reference, the wireless communication terminal including the WURx may decrease the WUR signal RX sensitivity. For example, the wireless communication terminal including the WURx may set the WUR signal RX sensitivity to −82 dBm.

In the embodiment of FIG. 23, the first WUR station WUR STA1 moves closer to the AP A. At this point, the RSSI of the WUR signal received by the first WUR station WUR STA1 increases, and the RSSI of the WUR signal is larger than a predetermined reference. Thus, the first WUR station WUR STA1 increases the WUR signal RX sensitivity. The wireless communication terminal including the WURx may lower the power consumption caused by receiving the WUR signal through this embodiment.

Figure 24:
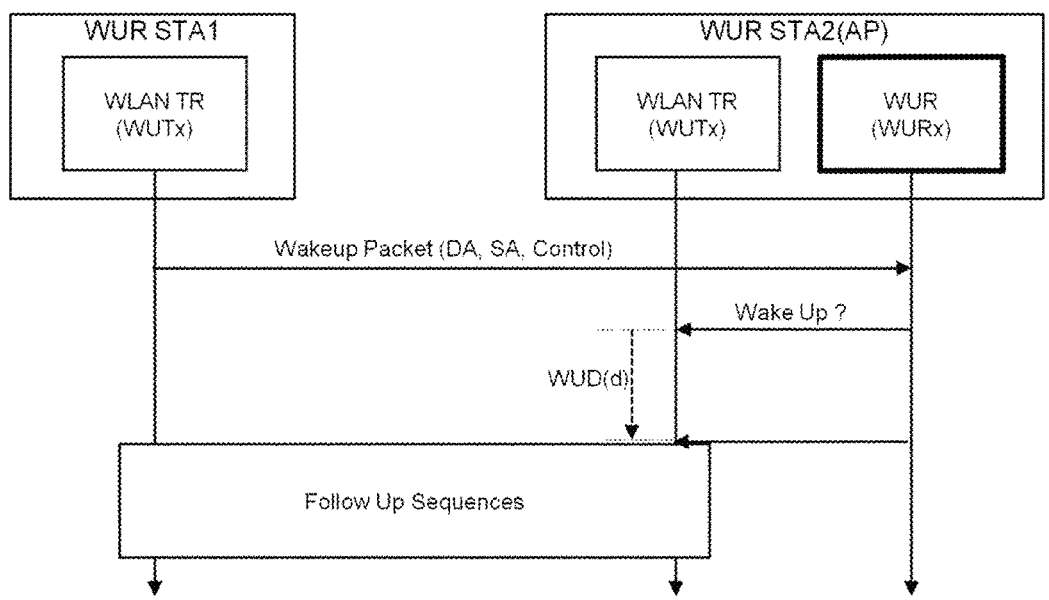
FIG. 24 shows an operation in which a non-AP wireless communication terminal transmits a WUR signal to an AP when the AP enters the WUR-based power save mode according to an embodiment of the present invention.

FIG. 24 shows an operation in which a non-AP wireless communication terminal transmits a WUR signal to an AP when the AP enters the WUR-based power save mode according to an embodiment of the present invention.

The AP wireless communication terminal includes the WURx and may enter the WUR-based power save mode. At this point, the AP wireless communication terminal may determine whether to stop the WUR-based power saving mode based on at least one of whether the association with the wireless communication terminal transmitting the wake-up packet is established and possibility of the association with the wireless communication terminal transmitting the wake-up packet. Specifically, if the AP wireless communication terminal receives the wake-up packet in the WUR-based power save mode and the association with the new wireless communication terminal is not allowed, the AP wireless communication terminal may maintain the WUR-based power save mode. Accordingly, when the AP wireless communication terminal receives the wake-up packet in the WUR-based power save mode and the association with the new wireless communication terminal is allowed, the AP wireless communication terminal may stop the WUR-based power save mode. In addition, when the AP wireless communication terminal receives the wake-up packet in the WUR-based power save mode and the association with the wireless communication terminal transmitting the wake-up packet is allowed, the AP wireless communication terminal may stop the WUR-based power save mode. At this point, the AP wireless communication terminal may determine whether an association with the wireless communication terminal transmitting the wake-up packet is possible based on at least one of the source address and the control information obtained from the wake-up packet.

In addition, when the AP wireless communication terminal receives the wake-up packet in the WUR-based power save mode and is associated with the wireless communication terminal transmitting the wake-up packet, the AP wireless communication terminal may stop the WUR-based power save mode. At this point, the wireless communication terminal transmitting the wake-up packet may signal that there is data to be transmitted in uplink using the wake-up packet. When the wake-up packet signals that there is data to be transmitted in uplink, the AP wireless communication terminal may wait for a subsequent transmission sequence on the primary channel after waking up in WUR-based power save mode.

Figure 25:
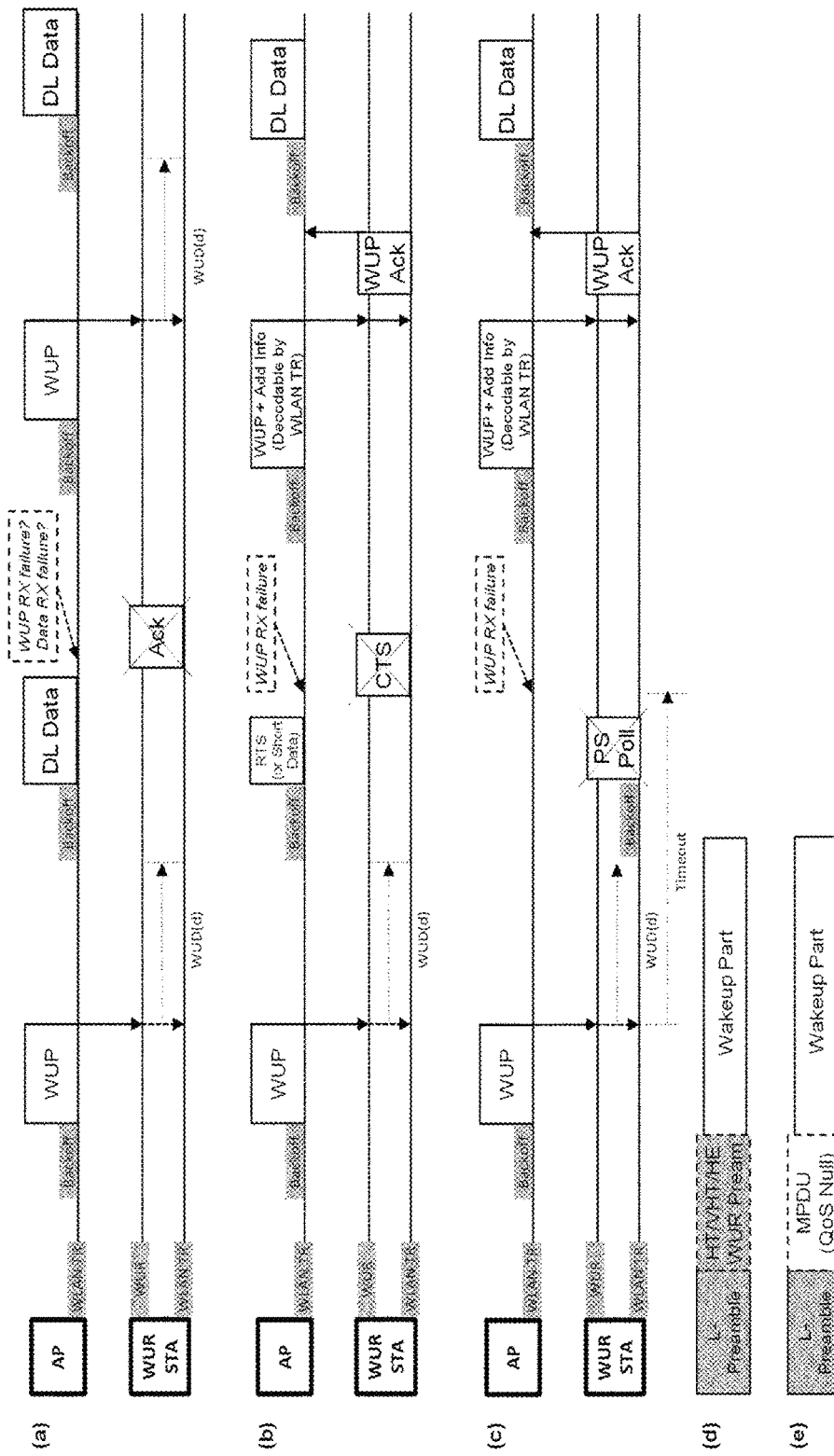
FIG. 25 shows an operation according to a transmission failure occurring in a subsequent operation sequence after a wireless communication terminal transmits a wake-up packet according to an embodiment of the present invention.

FIG. 25 shows an operation according to a transmission failure occurring in a subsequent operation sequence after a wireless communication terminal transmits a wake-up packet according to an embodiment of the present invention.

A wireless communication terminal including the WUTx may transmit the wake-up packet and start the wake-up subsequent operation sequence by performing the downlink transmission to the wireless communication terminal that instructs the wake-up using the WLAN TR. At this point, the wireless communication terminal including the WUTx may not receive a response from the wireless communication terminal instructing the wake-up. If the first transmission or reception fails after the wireless communication terminal including the WUTx transmits the wake-up packet, the wireless communication terminal including the WUTx may transmit the wake-up packet again. The wireless communication terminal including the WUTx may not be able to determine whether the downlink transmission is failed in the operation sequence after the wake-up, whether the wake-up packet transmission is failed, or whether the wake-up operation is not performed.

In the embodiment of FIG. 25(a), the AP transmits a wake-up packet WUP to the WUR station WUR STA. The AP starts a wake-up subsequent operation sequence after the wake-up requiring time of the WUR station from when the wake-up packet WUP transmission is completed. Specifically, the AP accesses a frequency band for transmitting downlink data DL Data through a backoff procedure after a wake-up requiring time. The AP transmits downlink data DL Data to the WUR station WUR TA in the TXOP obtained through the backoff procedure. The AP does not receive an ACK frame from the WUR station WUR STA. At this point, the AP may not determine whether an ACK frame is not received due to the transmission failure of a wakeup packet WUP or an ACK frame is not received due to the transmission failure of downlink data DL Data. The AP transmits again a wake-up packet WUP to the WUR station WUR STA. The AP again starts a wake-up subsequent operation sequence after the wake-up requiring time of the WUR station from when the wake-up packet WUP transmission is completed. In this embodiment, even if the first transmission or reception fails after transmitting the wake-up packet, the wireless communication terminal including the WUTx may transmit the wake-up packet again, resulting in inefficiency.

The wireless communication terminal including the WUTx may use a predetermined transmission parameter in the first transmission after transmitting the wake-up packet. Specifically, the predetermined transmission parameter may be a robust transmission parameter that is more than a predetermined reference. In addition, the transmission parameter may include a Modulation & Coding Scheme (MCS). In addition, the transmission parameter may include the length of the WLAN frame. Specifically, the wireless communication terminal including the WUTx may transmit a frame having a length shorter than a predetermined length in the first transmission after transmitting the wake-up packet. The wireless communication terminal including the WUTx may reduce the possibility of failure of the first transmission after transmitting the wake-up packet through this operation, and prevent the retransmission of the wake-up packet caused by the failure of the first transmission after transmitting the wake-up packet. However, the wireless communication terminal including the WUTx may determine the transmission failure of a wake-up packet only after the first transmission from when transmitting the wake-up packet.

Thus, the wireless communication terminal including the WURx may transmit an ACK for a wake-up packet. At this point, the ACK for the wake-up packet may be the frame of the WLAN. Specifically, the ACK for the wake-up packet may be a PS-Poll frame. In addition, the ACK for the wakeup packet may include both the transmitter address and the receiver address. This is because when the ACK for the wake-up packet includes only the receiver address and the wake-up packet is transmitted to a plurality of wireless communication terminals, the wireless communication terminal including the WUTx may be not able to determine from which wireless communication terminal the ACK for the wake-up packet is transmitted.

In addition, the wake-up packet transmitted again by the wireless communication terminal including the WUTx may include information that the WLAN TR is capable of decoding. Specifically, the wake-up packet transmitted again by the wireless communication terminal including the WUTx may include the information identifying the receiver in a form that the WLAN TR is capable of decoding. If the wireless communication terminal including the WURx turns off the WURx in the already wake-up state, the wireless communication terminal including the WUTx may not receive the re-transmitted wake-up packet.

In the embodiment of FIG. 25(b), the AP transmits a wake-up packet WUP to the WUR station WUR STA. The AP starts a wake-up subsequent operation sequence after the wake-up requiring time of the WUR station from when the wake-up packet WUP transmission is completed. Specifically, the AP accesses a frequency band for transmitting downlink data DL Data through a backoff procedure after a wake-up requiring time. The AP transmits a RTS frame having a relatively short length or a data frame having a length less than a predetermined reference to the WUR station WUR STA in the TXOP obtained through the backoff procedure. If the WUR station WUR STA receives an RTS frame or a data frame and fails to receive a CTS frame or an ACK frame, it may be assumed that the transmission of a wake-up packet WUP fails. This is because it is unlikely that the transmission of a RTS frame having a relatively short length or a data frame having a length less than a predetermined reference fails. Therefore, the AP may be not able to determine that the ACK frame is not received from the WUR station WUR STA due to the transmission failure of the wake-up packet WUP. The AP transmits again a wake-up packet WUP to the WUR station WUR STA. At this point, the AP adds information that the WLAN TR is capable of decoding to the wake-up packet WUP and transmits the wake-up packet. The information that the WLAN TR is capable of decoding may include information that may identify the recipient of the wake-up packet WUP. The WUR station WUR STA transmits an ACK WUP ACK for the wakeup packet to the AP. The AP receives the ACK WUP ACK for the wake-up packet from the WUR station WUR STA. The AP accesses a frequency band for transmitting downlink data DL Data through a backoff procedure after a wake-up requiring time. The AP transmits downlink data DL Data to the WUR station WUR TA in the TXOP obtained through the backoff procedure.

In the embodiment of FIG. 25(c), the AP and the WUR station WUR STA operate in the same manner as those in the embodiment of FIG. 25(b). However, the WUR station WUR STA transmits a PS Poll frame as an ACK for the wake-up packet.

The wake-up packet may include information that the WLAN TR is capable of decoding. The wake-up packet may include a legacy preamble and an additional preamble of the WLAN PPDU in the legacy part, as described with reference to FIG. 8. At this point, the additional preamble may include at least one of information on the transmitter of the wake-up packet and information on the receiver. The wireless communication terminal receiving the wake-up packet may extract at least one of the information on the transmitter and the information on the receiver from the additional preamble of the legacy part of the wake-up packet. At this point, the information on the transmitter and the information on the receiver may be an Association ID (AID). In yet another specific embodiment, the information on the transmitter and the information on the receiver may be Partial AID. Furthermore, the additional preamble may include information indicating a wake-up packet. Further, the additional preamble may be a non-legacy preamble included in the WLAN PPDU. Specifically, the non-legacy preamble may be any of an HT preamble, a VHT preamble, and an HE preamble. Specifically, the wake-up packet may be the same as that in the embodiment of FIG. 25(d).

In yet another specific embodiment, the wake-up packet may include an MPDU. Specifically, the legacy part of the wake-up packet may include an MPDU after the legacy preamble. The wireless communication terminal receiving the wake-up packet may obtain information on the receiver of the wakeup packet from the MPDU. Also, the MPDU does not include a payload and may include the MAC address of the receiver of the wake-up packet. In addition, the MPDU may include an indicator indicating a wake-up packet. In a specific embodiment, the MPDU may be a QoS Null MPDU. Specifically, the wake-up packet may be the same as that in the embodiment of FIG. 25(e). The wake-up packet transmitted again by the wireless communication terminal including the WUTx may be the same as the wake-up packet format described in the embodiment of FIGS. 25(d) and 25(e).

Figure 26:
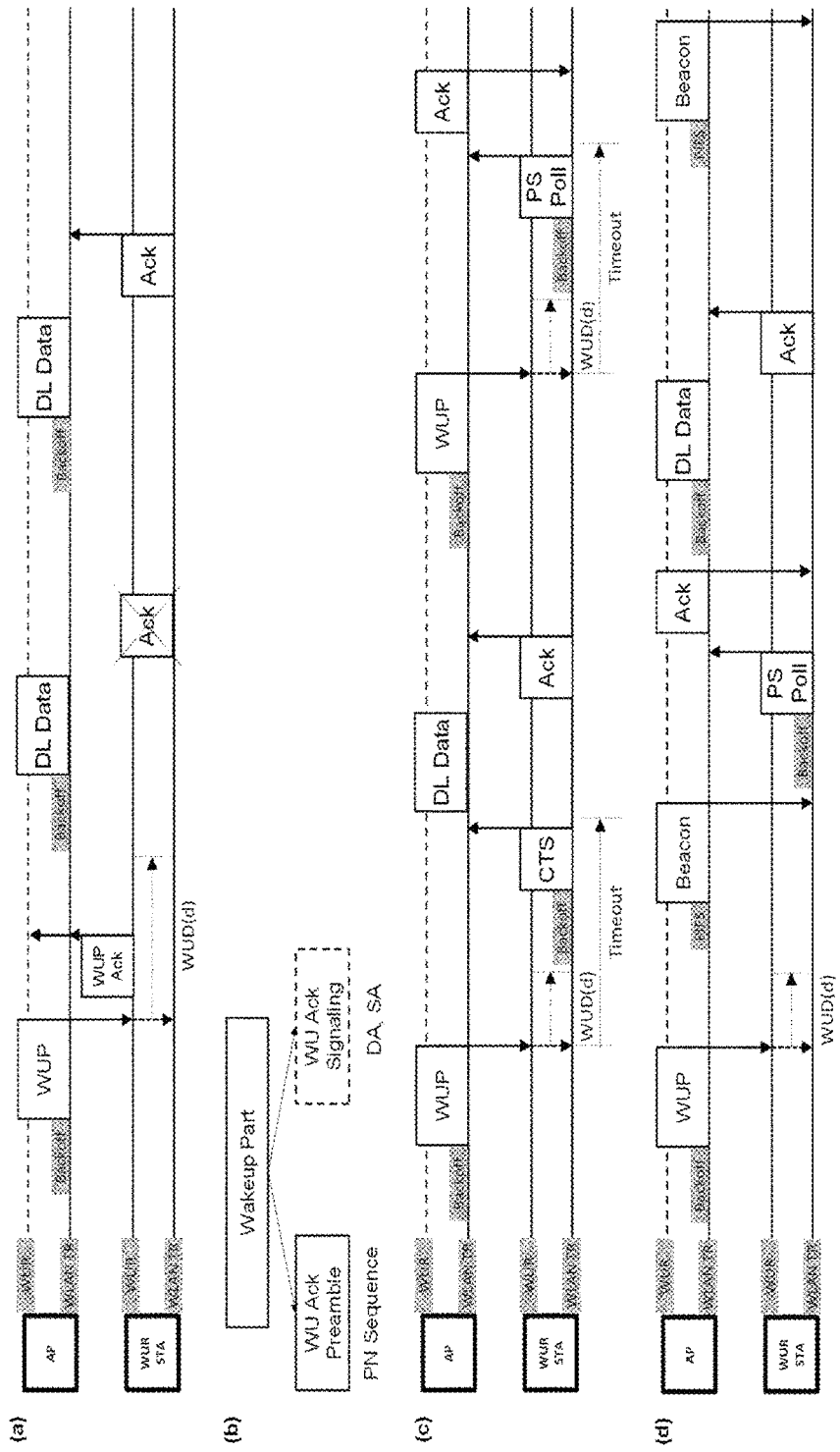
FIG. 26 shows an operation in which a wireless communication terminal receives a wake-up packet and transmits an ACK for a wake-up packet according to an embodiment of the present invention.

FIG. 26 shows an operation in which a wireless communication terminal receives a wake-up packet and transmits an ACK for a wake-up packet according to an embodiment of the present invention.

As described above, the wireless communication terminal including the WURx may transmit an ACK for a wake-up packet. The wireless communication terminal including the WUTx may determine whether the wake-up packet transmission fails based on whether an ACK for the wake-up packet is received. Specifically, when the wireless communication terminal including the WUTx does not receive the ACK for the wake-up packet for a predetermined time, the wireless communication terminal including the WUTx may determine that the wake-up packet transmission fails.

In the embodiment of FIG. 26(a), the AP transmits a wake-up packet WUP to the WUR station WUR STA. The WUR station WUR STA transmits an ACK for the wakeup packet to the AP. The AP starts a wake-up subsequent operation sequence after the wake-up requiring time WUD (d) of the WUR station from when the wake-up packet WUP transmission is completed. Specifically, the AP accesses a frequency band for transmitting downlink data DL Data through a backoff procedure after a wake-up requiring time. The AP transmits downlink data DL Data to the WUR station WUR TA in the TXOP obtained through the backoff procedure. The AP does not receive an ACK frame for downlink data DL Data. Therefore, the AP transmits downlink data DL Data to the WUR station WUR STA again.

The wireless communication terminal including the WURx may transmit an ACK for a wake-up packet through a WUR signal. The wireless communication terminal including the WUTx may receive an ACK for a wake-up packet using the WURx. When the wireless communication terminal including the WUTx does not include the WURx, the wireless communication terminal including the WUTx may receive the ACK for the wake-up packet using the WLAN TR. Specifically, the ACK for the wake-up packet may be divided into a preamble part and a signaling part as in the embodiment of FIG. 26(b). The ACK for the wake-up packet may not include the legacy-part, unlike the wake-up packet. This is because the wireless communication terminal including the WURx may not support the OFDM modulation used for the WLAN signal. At this point, the L-Length field of the legacy signaling field included in the legacy part of the wake-up packet may be set based on the length of the wake-up packet and the length of the ACK for the wake-up packet. Specifically, the L-Length field of the legacy signaling field included in the legacy part of the wake-up packet may be set based on the time point at which the ACK transmission for the wake-up packet is completed.

Also, the preamble part of the wake-up part of the ACK for the wake-up packet may include a signal pattern sequence PN sequence indicating an ACK for the wake-up packet. At this point, the signal pattern sequence indicating an ACK for the wake-up packet may be different from the signal pattern sequence indicating the wake-up packet in the preamble part of the wake-up packet. Also, the signal pattern sequence indicating an ACK for the wake-up packet may be similar to Short Training Field (L-STF). Also, the signal pattern sequence indicating the ACK for the wake-up packet may be a pattern in which a signal of the same pattern is repeated a predetermined number of times on the time axis.

The signaling part of the wake-up part of the ACK for the wake-up packet may include a source address SA and a destination address DA as described above. In addition, the wake-up part of the ACK for the wake-up packet may not include the signaling part. The wireless communication terminal including the WURx may insert a preamble part into a wake-up part of an ACK for a wake-up packet, and may not insert a signaling part. At this point, the wireless communication terminal including the WUTx may transmit the wake-up packet and receive the ACK for the wake-up packet after SIFS from when transmitting the wake-up packet.

The wireless communication terminal including the WURx may transmit the control frame to the wireless communication terminal including the WUTx after waking up according to the wake-up packet. The wireless communication terminal including the WURx may transmit the control frame to the wireless communication terminal including the WUTx within a predetermined time after waking up according to the wake-up packet. The control frame may be a CTS frame. The wireless communication terminal including the WUTx may receive the CTS frame and transmit the downlink data to the wireless communication terminal including the WURx. In addition, the control frame may be a PS-Poll frame. The wireless communication terminal including the WUTx may receive the PS-Poll frame and schedule the downlink data transmission for the wireless communication terminal including the WURx based on the PS-Poll frame.

If the wireless communication terminal including the WUTx fails to receive the control frame from the wireless communication terminal including the WURx, the wireless communication terminal including the WUTx may transmit the wake-up packet again to the wireless communication terminal including the WURx. The predetermined time may be determined based on the wake-up requiring time of the wireless communication terminal including the WURx. Specifically, the predetermined time may be determined based on a wake-up requiring time of a wireless communication terminal including WURx, a transmission time of a control frame, and a frequency band access time. In a specific embodiment, the predetermined time may be the sum of a wake-up requiring time of a wireless communication terminal including WURx, a transmission time of a control frame, and a frequency band access time.

In the embodiment of FIG. 26(c), the AP transmits a wake-up packet WUP to the WUR station WUR STA. The WUR station WUR STA accesses the frequency band through the backoff procedure and transmits the CTS frame to the AP in the TXOP obtained through the backoff procedure. The AP transmits downlink data DL Data to the WUR station WUR STA again. The WUR station WUR STA transmits an ACK frame for downlink data DL Data to the AP. The AP transmits again a wake-up packet WUP to the WUR station WUR STA. The WUR station WUR STA accesses the frequency band through the backoff procedure and transmits the PS-Poll frame to the AP in the TXOP obtained through the backoff procedure. The AP receives the PS-Poll frame and schedules the transmission to the WUR station WUR STA based on the PS-Poll frame. In addition, the AP transmits an ACK for the PS-Poll frame to the WUR station WUR STA.

The wireless communication terminal including the WURx may receive the beacon frame from the wireless communication terminal including the WUTx after waking up according to the wake-up packet. At this point, the wireless communication terminal including the WURx may obtain information on the downlink data transmission sequence from the beacon frame. Specifically, the information on the downlink data transmission sequence may be a traffic indication map (TIM). At this point, the TIM may indicate that there is downlink data to be transmitted by the wireless communication terminal including the WUTx. In addition, the wireless communication terminal including the WURx may transmit a PS-Poll frame to signal that the wireless communication terminal including the WURx is in the wake-up state. Also, the wireless communication terminal including the WUTx may transmit the wake-up packet to the wireless communication terminal including the WURx before a time preceding by the wake-up requiring time of the wireless communication terminal including WURx from the time at which the beacon is to be transmitted.

When the wireless communication terminal including the WUTx fails to receive a response to a beacon frame from a wireless communication terminal including WURx within a predetermined time from when a beacon frame is transmitted, the wireless communication terminal including the WUTx may transmit the wake-up packet again to the wireless communication terminal including the WURx. The predetermined time may be determined based on the beacon period of the wireless communication terminal including the WURx. Specifically, when the wireless communication terminal including the WUTx does not receive a response to the beacon frame from the wireless communication terminal including the WURx before a time preceding by the wake-up requiring time of the wireless communication terminal including WURx from the next beacon transmission period from when transmitting the beacon frame, the wireless communication terminal including the WUTx may transmit the wake-up packet again to the wireless communication terminal including the WURx.

In the embodiment of FIG. 26(d), the AP transmits a wake-up packet WUP to the WUR station WUR STA. The AP accesses the frequency band through the backoff procedure and transmits the beacon frame to the WUR station WUR STA in the TXOP obtained through the backoff procedure. The WUR station WUR STA transmits a PS-Poll frame to the AP. The AP receives the PS-Poll frame and schedules the transmission to the WUR station WUR STA based on the PS-Poll frame. In addition, the AP transmits an ACK for the PS-Poll frame to the WUR station WUR STA. The AP transmits downlink data DL Data to the WUR station WUR STA again according to a transmission schedule. At this point, the AP accesses the frequency band through the backoff procedure and transmits the downlink data DL Data to the WUR station WUR STA in the TXOP obtained through the backoff procedure. The WUR station WUR STA receives downlink data DL Data and transmits an ACK frame for downlink data DL Data to the AP. In addition, the AP transmits a beacon frame to the WUR station WUR STA in the next cycle.

Figure 27:
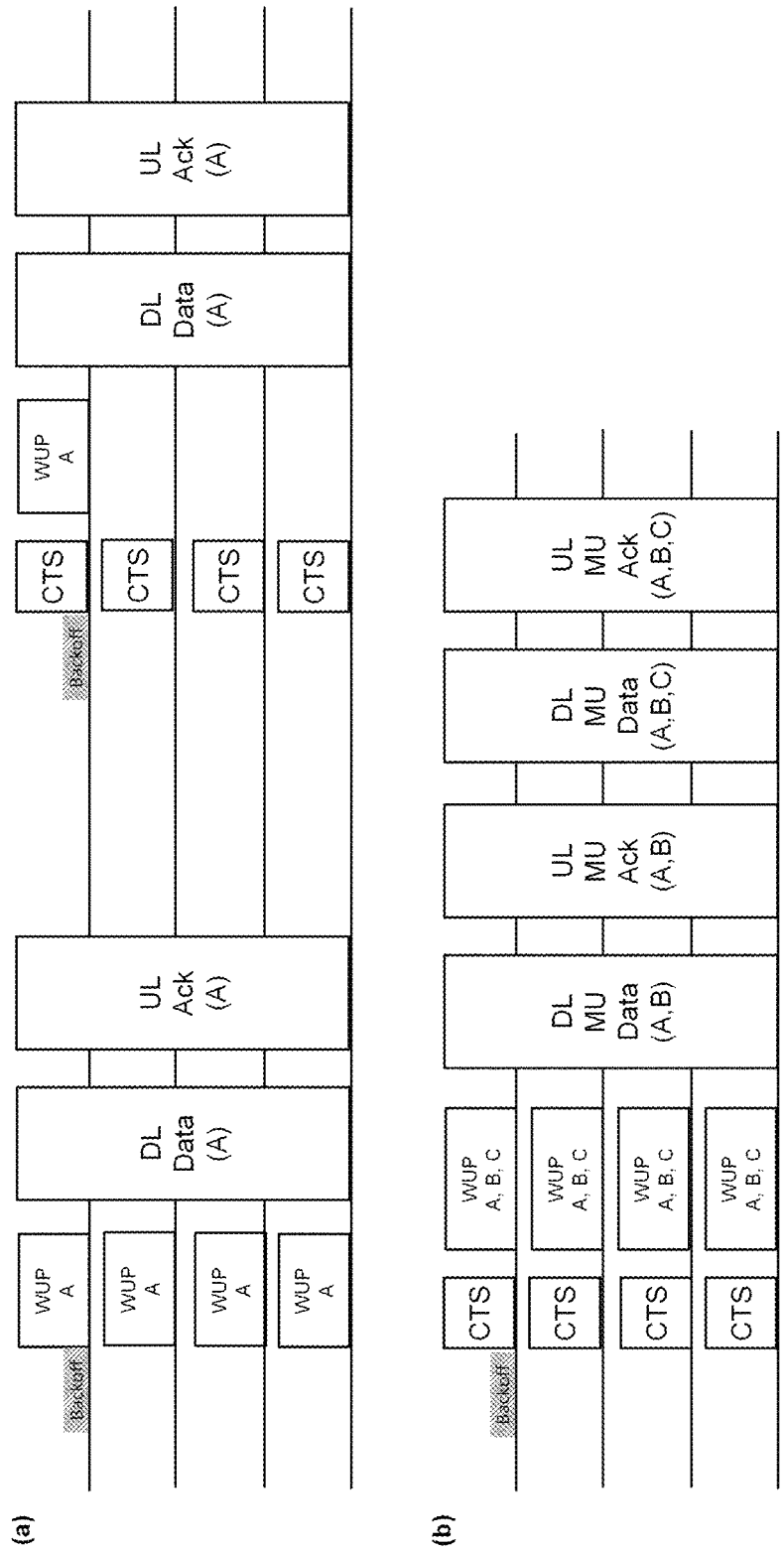
FIG. 27 shows that a wireless communication terminal according to an embodiment of the present invention transmits a wake-up packet through a plurality of channels.

FIG. 27 shows that a wireless communication terminal according to an embodiment of the present invention transmits a wake-up packet through a plurality of channels.

The wireless communication terminal including the WUTx may set the bandwidth of the frequency band for transmitting the wake-up packet based on the bandwidth of the PPDU transmitted in the wake-up subsequent operation sequence. At this point, the unit bandwidth indicates the minimum bandwidth at which the wake-up packet may be transmitted. Specifically, the wireless communication terminal including the WUTx may transmit the wake-up packet in each unit bandwidth of the frequency band in which the PPDU is transmitted in the wake-up subsequent operation sequence. In a specific embodiment, when a unit bandwidth is 20 MHz and a PPDU is transmitted through a frequency band having an 80 MHz bandwidth in a wake-up subsequent operation sequence, the wireless communication terminal including the WUTx may transmit a wake-up packet every 20 MHz band. The wireless communication terminal including the WURx may receive a wake-up packet from any frequency band having a unit bandwidth. At this point, any one of the frequency bands may be a predetermined channel. Specifically, any one of the frequency bands may be a primary channel. In the first embodiment of FIG. 27(a), the AP transmits PPDUs with an 80 MHz bandwidth in the wake-up subsequent operation. At this point, the AP first transmits a wake-up packet at every 20 MHz to transmit a total of four wake-up packets, and transmits a PPDU including downlink data DL Data to the first station A through an 80 MHz bandwidth. The AP receives an ACK for downlink data DL Data from the first station A. The wireless communication terminal including the WUTx may prevent another wireless communication terminal from accessing a frequency band in which a subsequent wake-up operation sequence will proceed through this embodiment. However, when the wireless communication terminal including the WUTx transmits a plurality of wake-up packets, the transmission power of individual wake-up packets may be reduced.

The wireless communication terminal including the WUTx may transmit a CTS frame and transmit a wake-up frame. At this point, the wireless communication terminal including the WUTx may transmit the CTS frame based on the bandwidth of the PPDU transmitted in the wake-up subsequent operation sequence. In addition, when the bandwidth of the PPDU transmitted in the subsequent wake-up operation sequence is larger than the unit bandwidth, the wireless communication terminal including the WUTx may transmit one wake-up packet through the unit bandwidth. In a specific embodiment, when a unit bandwidth is 20 MHz and a PPDU is transmitted through a frequency band having an 80 MHz bandwidth in a wake-up subsequent operation sequence, the wireless communication terminal including the WUTx may transmit a CTS frame every 20 MHz band and transmit a wake-up packet through any one of the 20 MHz bands. In the second embodiment of FIG. 27(a), the AP transmits PPDUs with an 80 MHz bandwidth in the wake-up subsequent operation. At this point, the AP first transmits a CTS frame every 20 MHz to transmit a total of 4 CTS frames, and transmits a wake-up packet through the first 20 MHz band. Also, the AP transmits the PPDU including the downlink data DL Data to the first station A through the 80 MHz bandwidth. The AP receives an ACK for downlink data DL Data from the first station A. The wireless communication terminal including the WUTx may prevent another wireless communication terminal from accessing a frequency band in which a subsequent wake-up operation sequence will proceed through this embodiment. The wireless communication terminal including the WUTx may prevent other wireless communication terminals from accessing the frequency band to be used in the wake-up subsequent operation through this embodiment.

The wireless communication terminal including the WUTx may also apply the above-described embodiments when transmitting a wake-up packet signaling wake-up information on a plurality of wireless communication terminals. Specifically, when the wireless communication terminal including the WUTx transmits a wake-up packet signaling wake-up information on a plurality of wireless communication terminals, the wireless communication terminal including the WUTx may set the bandwidth of the frequency band for transmitting the wake-up packet based on the bandwidth of the PPDU transmitted in the wake-up subsequent operation sequence. Further, when the wireless communication terminal including the WUTx transmits a wake-up packet signaling wake-up information on a plurality of wireless communication terminals, the wireless communication terminal including the WUTx may transmit a CTS frame and transmit a wake-up frame. At this point, the wireless communication terminal including the WUTx may transmit the CTS frame based on the bandwidth of the PPDU transmitted in the wake-up subsequent operation sequence. In these embodiments, the wireless communication terminal including the WUTx may sequentially perform the wake-up subsequent operation with the plurality of wake-up wireless communication terminals. In the embodiment of FIG. 27(b), the AP transmits the PPDU with an 80 MHz bandwidth in the wake-up subsequent operation. At this point, the AP first transmits a CTS frame every 20 MHz and transmits a total of 4 CTS frames. In addition, the AP transmits a total of 4 wake-up packets by transmitting a wake-up packet every 20 MHz. At this point, the wake-up packet signals the wake-up information on the first station A, the second station B, and the third station C. Also, the AP transmits the PPDU including the downlink data DL Data to the first station A and the second station B through the 80 MHz bandwidth. The AP receives an ACK for the downlink data DL Data from the first station A and the second station B. Also, the AP transmits the PPDU including the DL data to the first station A, the second station B, and the third station C through the 80 MHz bandwidth. The AP receives an ACK for the downlink data DL Data from the first station A, the second station B, and the third station C.

Figure 28:
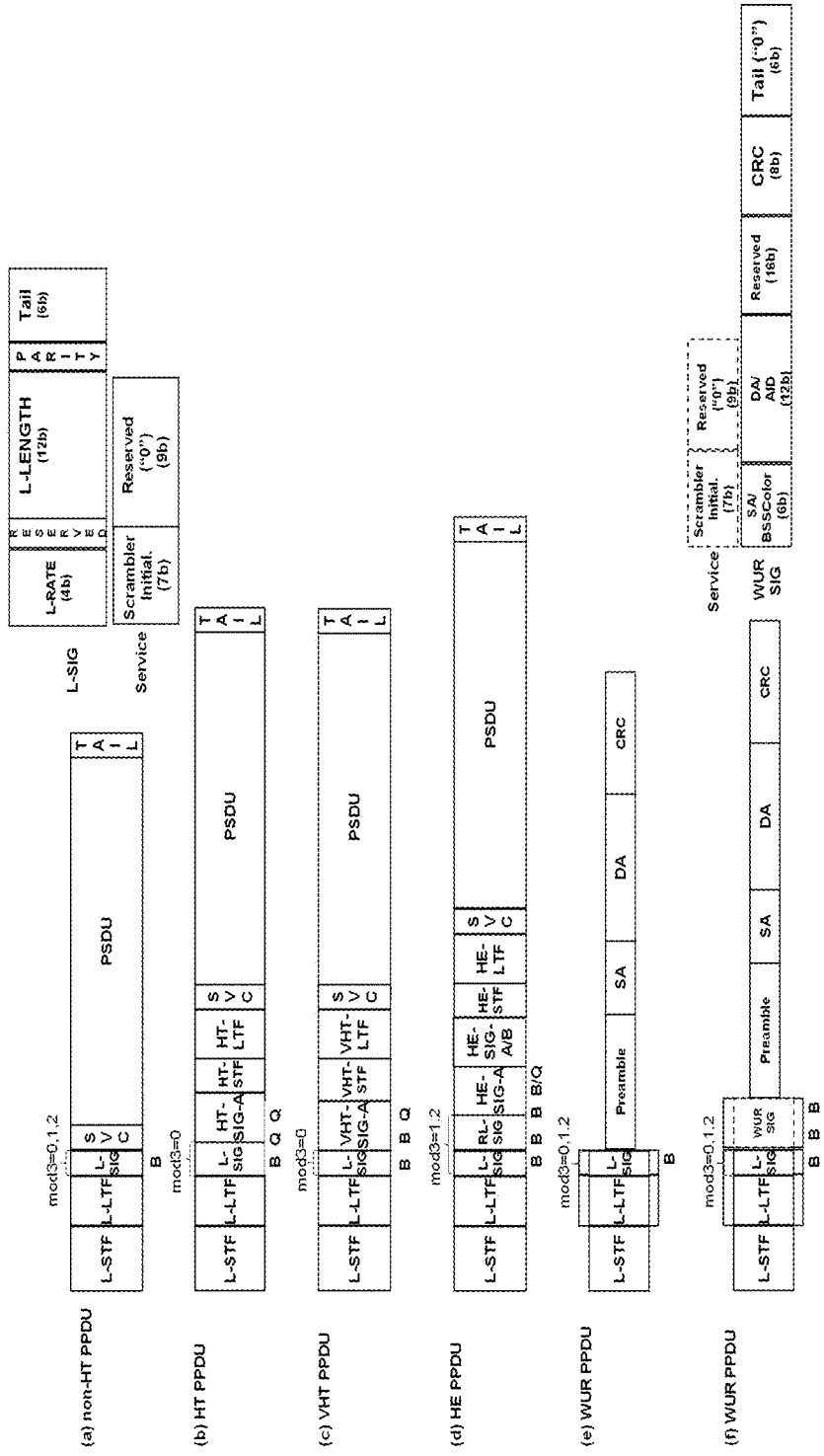
FIG. 28 shows a format of a wake-up packet and a format of a legacy WLAN PPDU transmitted by a wireless communication terminal according to an embodiment of the present invention.

FIG. 28 shows a format of a wake-up packet and a format of a legacy WLAN PPDU transmitted by a wireless communication terminal according to an embodiment of the present invention.

FIGS. 28(a) to 28(d) show the format of a WLAN PPDU transmitted by a legacy wireless communication terminal. The WLAN PPDU includes L-STF and L-LTF. The wireless communication terminal receiving the WLAN PPDU may perform frame detection and Automatic Gain Control (AGC) transmitted after the L-STF based on the L-STF. In addition, the wireless communication terminal receiving the WLAN PPDU may estimate the channel for each subcarrier based on the L-LTF. The wireless communication terminal transmitting the WLAN PPDU transmits L-LTF using a total of 64 (−32 to 31) subcarriers of 64 FFT OFDM. At this point, the wireless communication terminal transmitting the WLAN PPDU uses 6 (−32 to −27) left and 5 (27 to 31) right subcarriers as guard subcarriers, and uses one central subcarrier (0) as a DC subcarrier. The wireless communication terminal transmitting the WLAN PPDU uses, as pilot subcarriers, left and right four subcarriers (31 21, −7, 7, 21)

among the remaining 52 subcarriers excluding a total of 12 subcarriers including guard carriers and DC subcarriers. The wireless communication terminal transmitting the WLAN PPDU transmits data using the remaining 48 subcarriers. At this point, when the wireless communication terminal transmitting the WLAN PPDU uses an MCS corresponding to Binary Phase Shift Keying (BPSK) and Rate=1/2, the wireless communication terminal transmitting the WLAN PPDU may transmit a total of 24 bits of L-SIG.

The L-SIG of FIG. 28(*a*) shows the formats of the L-SIG field and the RL-SIG field commonly applied to FIGS. 28(*a*) to 28(*d*). In addition, the service field of FIG. 28(*a*) shows a specific format of the service field. The service field includes a Scrambler Initialization Sequence. The wireless communication terminal receiving the WLAN PPDU may obtain an initialization sequence from the service field and set an initial value of the encoder and decoder based on the Scrambler Initialization Sequence. The L-SIG may include an L_RATE field, an L_LENGTH field, a Parity field, and a Tail field. The L_RATE field indicates the MCS used for the L-SIG transmission. Specifically, the L_RATE field may indicate the transmission rate by a combination of the modulation method and the code rate used for the L-SIG transmission. At this point, the modulation method may be any one of BPSK, QPSK, 16-QAM, and 64-QAM. In addition, the code rate may be any of 1/2, 2/3 and 3/4. Therefore, the transmission rate indicated by the L_RATE field may be any one of 6 Mbps, 9 Mbps, 12 Mbps, 18 Mbps, 24 Mbps, 36 Mbps, 48 Mbps and 54 Mbps. The L_RATE field of the WLAN PPDU is set to 6 Mbps. The L-LENTGH field is used to indicate the length of the PPDU. Specifically, the wireless communication terminal receiving the WLAN PPDU may obtain the length of the PPDU based on the L-LENGTH field and the L-RATE field. In addition, the wireless communication terminal receiving the WLAN PPDU may distinguish the format of the WLAN PPDU based on the value indicated by the L-LENGTH field. If the L-RATE field is set to 6 Mbps, L-RATE indicates that one 64 FFT OFDM symbol with a duration of 4 us used in the transmission signaled by L-RATE may transmit 3 bytes. The wireless communication terminal receiving the WLAN PPDU may regard the SVC field and the Tail field as the duration of one OFDM symbol. The wireless communication terminal receiving the WLAN PPDU may obtain the length of the PPDU using the following equation.

$$\text{PPDU\_LENGTH} = \text{RXTIME} = \text{TXTIME} = \text{ceil}[(L\_LENGTH+3)/3] \times 4 + 20.$$

At this point, the unit of PPDU_LENGTH is us. In addition, 20 is the sum of the lengths of L-STF, L-LTF and L-SIG. ceil[x] represent a rounding operation. Specifically, ceil[x] represents the next natural number greater than x. When the maximum value of L_LENGTH is 4095, the maximum value of PPDU_LENGTH may be 5.484 ms.

In the above equation, even if the values of the L-LENGTH field are different by the rounding operation, a case of representing the same length of PPDU occurs often. Specifically, the values 3k+1, 3k+2, and 3k+3 of the L-LENGTH field indicate the same lengths of the PPDUs. Therefore, the wireless communication terminal transmitting the WLAN PPDU may set the value of the L-LENGTH field to signal the format of the PPPDU. The wireless communication terminal receiving the WLAN PPDU may determine the format of the PPPDU based on the length of the L-LENGTH field.

In addition, the wireless communication terminal transmitting the WLAN PPDU may set the modulation method of a plurality of symbols transmitted after the L-SIG field to signal the type of the WLAN PPDU. At this point, the wireless communication terminal receiving the WLAN PPDU may determine the type of the WLAN PPDU by detecting the modulation method of a plurality of symbols transmitted after the L-SIG field. Specifically, the wireless communication terminal transmitting the HT PPDU may modulate the two OFDM symbols after the L-SIG with Quadrature Binary Phase Shift Keying (QBPSK) to signal that the corresponding PPDU is the HT PPDU. At this point, the two OFDMA symbols after the L-SIG are the preceding two symbols of the OFDM symbols transmitting the HT-SIG-A. In addition, the wireless communication terminal transmitting the VHT PPDU may modulate the two OFDM symbols after the L-SIG with BPSK and QBPSK to signal that the corresponding PPDU is the HT PPDU. At this point, the two OFDMA symbols after the L-SIG are the preceding two symbols of the OFDM symbols transmitting the VHT-SIG-A. In addition, the wireless communication terminal transmitting the HE PPDU may transmit RL-SIG after L-SIG, and may modulate the two OFDM symbols after RL-SIG with QBPSK to signal that the corresponding PPDU is the HT PPDU. At this point, the two OFDMA symbols after the L-SIG may signal that the corresponding PPDU is the HE PPDU by modulating the first two symbols of the OFDM symbols transmitting the HT-SIG-A with BPSK and QBPSK.

FIG. 28(*e*) shows a format of a wake-up packet according to an embodiment of the present invention.

As described above, the wake-up packet may be divided into a legacy part and a wake-up part. The legacy part is for coexistence with a legacy wireless communication terminal. Specifically, the legacy part may include L-STF, L-LTF, and L-SIG fields. Also, a legacy part and a wake-up part may include a preamble and an address related to transmission or reception. At this point, an address related to transmission or reception may include at least one of a source address (SA) and a destination address (DA). The wireless communication terminal including the WUTx may signal information on the wake-up packet using a legacy part. At this point, the wireless communication terminal receiving the wake-up packet may obtain information on the wake-up packet based on the legacy part of the wake-up packet. Specifically, the wireless communication terminal receiving the wake-up packet may obtain the information on the wake-up packet by receiving the legacy part of the wake-up packet through the WLAN TR. First, information on a wake-up packet signaled by the wireless communication terminal including the WUTx using a legacy part will be described.

The wireless communication terminal including the WUTx may signal information on the wake-up packet using a modulation method of a plurality of symbols transmitted after the L-SIG field of the wake-up packet. The wireless communication terminal receiving the wake-up packet may obtain information on the wake-up packet using the modulation method of a plurality of symbols transmitted after the L-SIG field of the wake-up packet. Specifically, the wireless communication terminal including the WUTx may set the modulation method of a plurality of symbols transmitted after the L-SIG field to indicate that it is a wake-up packet. Also, the wireless communication terminal including the WUTx may detect a modulation method of a plurality of symbols transmitted after the L-SIG field, and determine whether the packet is a wake-up packet.

Further, the wireless communication terminal including the WUTx may signal the BSS information using the legacy part. The wireless communication terminal receiving the wake-up packet may obtain information on the BSS to which the wake-up packet is transmitted based on the legacy part of the wake-up packet. Further, the wireless communication terminal including the WUTx may signal information on a receiver of a wake-up packet using a legacy part. If the BSS to which the wake-up packet is transmitted is a BSS with which the wireless communication terminal receiving the wake-up packet is associated and the receiver of the wake-up packet is not the wireless communication terminal receiving the wake-up packet, the wireless communication terminal receiving the wake-up packet may maintain the WUR-based power save mode while the corresponding wake-up packet is transmitted. In addition, if the BSS to which the wake-up packet is transmitted is a BSS with which the wireless communication terminal receiving the wake-up packet is associated and the receiver of the wake-up packet is not the wireless communication terminal receiving the wake-up packet, the wireless communication terminal receiving the wake-up packet may maintain the WUR-based power save mode during the subsequent operation sequence after wake-up. Furthermore, if the BSS to which the wake-up packet is transmitted is a BSS with which the wireless communication terminal receiving the wake-up packet is associated and the receiver of the wake-up packet is the wireless communication terminal receiving the wake-up packet, the wireless communication terminal receiving the wake-up packet may transmit an ACK for the wake-up packet. In particular, the wireless communication terminal receiving the wake-up packet may receive the legacy part of the wake-up packet and immediately transmit an ACK for the wake-up packet. Further, the wireless communication terminal including the WUTx may signal information on a transmitter of a wake-up packet using a legacy part.

A method for a wireless communication terminal including WUTx to signal information on a wake-up packet using a legacy part will be described.

The wireless communication terminal including the WUTx may signal information on the wake-up packet by setting at least one of the L-RATE field, the L-LENGTH field, and the Reserved field to a predetermined value. Specifically, the wireless communication terminal including the WUTx may signal information on the wake-up packet by setting at least one of the L-RATE field, the L-LENGTH field, and the Reserved field to a value not used in the WLAN PPDU. In a specific embodiment, the wireless communication terminal including the WUTx may signal the information on the wake-up packet by setting the value of the L-LENGTH field of the legacy part of the wake-up packet. In particular, the wireless communication terminal including the WUTx may signal information on a wake-up packet using three different values of the L-LENGTH field indicating the same PPDU length. The wireless telecommunications terminal receiving the wake-up packet may obtain information on the wake-up packet based on the value of the L-LENGTH field of the legacy part of the wake-up packet. At this point, the information on the wake-up packet may be the format of the wake-up packet.

In another specific embodiment, the wireless communication terminal including the WUTx may signal information on a wake-up packet using a guard subcarrier of at least one of the L-LTF and L-SIG fields. At this point, the guard subcarrier used by the wireless communication terminal including the WUTx may be a previously unused subcarrier. Specifically, the guard subcarrier used by the wireless communication terminal including the WUTx may be at least one of −28, −27, 27, and 28. When the wireless communication terminal including the WUTx signals information on a wake-up packet using a guard subcarrier of at least one of the L-LTF and L-SIG fields, the wireless communication terminal including the WUTx may transmit a sequence for pre-specified channel estimation of guard subcarriers of first to second OFDM symbols transmitting L-LTF, and may then transmit information on the wake-up packet to the guarded subcarrier to be transmitted later. This is because in order to transmit data using an unused subcarrier, channel estimation for the corresponding subcarrier is required. The above-described signaling methods may be used independently or in combination.

FIG. 28(f) shows a format of a wake-up packet according to another embodiment of the present invention. As described above, the wireless communication terminal including the WUTx may transmit an additional preamble after the L-SIG field of the legacy part. At this point, the additional preamble may be a WUR SIG signaling information on the wake-up packet. Specifically, the WUR SIG may include at least one of information identifying a transmitter, information identifying a receiver, and information indicating a wake-up packet.

Further, the wireless communication terminal including the WUTx may signal the wake-up packet using the following embodiments. As described above, the wireless communication terminal including the WUTx may signal the wake-up packet by setting at least one of the L-RATE field, the L-LENGTH field, and the Reserved field to a predetermined value. At this point, the wireless communication terminal receiving the wake-up packet may determine whether the received PPDU is a wake-up packet based on the value of at least one of the L-RATE field, the L-LENGTH field, and the Reserved field.

The wireless communication terminal including the WUTx may signal a wake-up packet using a guard subcarrier of at least one of L-LTF, L-SIG field, and WUR SIG field. At this point, the guard subcarrier used by the wireless communication terminal including the WUTx may be a previously unused subcarrier. Specifically, the wireless communication terminal including the WUTx may transmit the signaling information using a guard subcarrier of a plurality of OFDM symbols among two OFDM symbols transmitting L-LTF, one OFDM symbol transmitting an L-SIG field, and two OFDM symbols transmitting a WUR SIG field. At this point, the wireless communication terminal including the WUTx may transmit the pattern for guard carrier channel estimation of some OFDM symbols among two OFDM symbols transmitting L-LTF, one OFDM symbol transmitting an L-SIG field, and two OFDM symbols transmitting a WUR SIG field. Further, the wireless communication terminal including the WUTx may repeat the pre-specified signal pattern in the guard subcarrier of at least one of the L-LTF, the L-SIG field, and the WUR SIG field to indicate a wake-up packet. At this point, the wireless communication terminal receiving the wake-up packet may determine whether the received PPDU is a wake-up packet based on a guard subcarrier of at least one of the L-LTF, the L-SIG field, and the WUR SIG field.

Further, the wireless communication terminal including the WUTx may signal the wake-up packet using the following embodiments. Specifically, the wireless communication terminal including the WUTx may modulate at least one OFDM symbol transmitting WUR SIG in the same manner as a non-HT PPDU. At this point, the wireless communication terminal including the WUTx may set the value of the service field of the L-SIG field differently from the non-HT PPDU. In a specific embodiment, the wireless communication terminal including the WUTx may modulate the modulation method of the first OFDM symbol and the second OFDM symbol transmitting the WUR SIG in the same manner as the non-HT PPDU. For example, the wireless communication terminal including the WUTx may modulate a first OFDM symbol and a second OFDM symbol transmitting WUR SIG with BPSK. In addition, the wireless communication terminal including the WUTx may set at least one of the nine bits of the service field to 1. Specifically, the wireless communication terminal including the WUTx may set all nine bits of the service field to 1.

The wireless communication terminal receiving the wake-up packet may determine whether the received PPDU is a wake-up packet based on the WUR SIG modulation method. Specifically, the wireless communication terminal receiving the wake-up packet may determine whether the received PPDU is a wake-up packet based on at least one OFDM symbol transmission method for transmitting WUR SIG. At this point, the wireless communication terminal receiving the wake-up packet may compare the value of the service field of the L-SIG field with the service field of the non-HT PPDU to determine whether the received PPDU is a wake-up packet. In a specific embodiment, the wireless communication terminal receiving the wake-up packet may determine whether the modulation method of the first OFDM symbol and the second OFDM symbol transmitting the WUR SIG is the same as the non-HT PPDU. At this point, the wireless communication terminal receiving the wake-up packet may determine whether the modulation method of at least one of the first OFDM symbol and the second OFDM symbol transmitting the WUR SIG is BPSK. In addition, the wireless communication terminal receiving the wake-up packet may determine whether the value of the service field of the L-SIG field is not all zeros. For example, the wireless communication terminal receiving the wake-up packet may determine the corresponding PPDU as a wake-up packet if the modulation method of the first OFDM symbol and the second OFDM symbol transmitting the WUR SIG is BPSK and if any of the bits of the service field of the L-SIG field is not 0.

Figure 29:
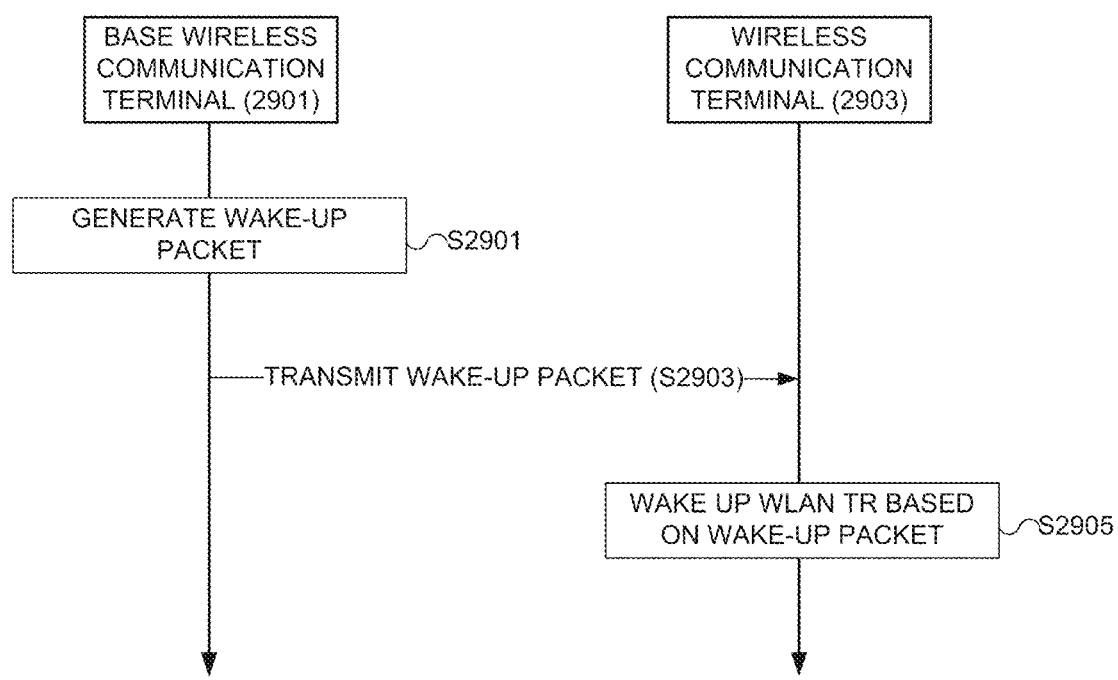
FIG. 29 shows operations of a base wireless communication terminal and a wireless communication terminal according to an embodiment of the present invention.

FIG. 29 shows operations of a base wireless communication terminal and a wireless communication terminal according to an embodiment of the present invention.

The base wireless communication terminal 2901 may include a WUTx. The base wireless communication terminal 2901 generates a wake-up packet indicating the wake-up-related information from the WUR-based power save mode to the wireless communication terminal 2903 (S3001). At this point, the base wireless communication terminal may insert a legacy part that the WLAN TR may demodulate and a wake-up part that the WLAN TR may not demodulate into a wake-up packet. At this point, the legacy part may include a legacy preamble part, which is a preamble included in the WLAN PPDU, and an additional preamble, which is transmitted after the legacy preamble part. At this point, the additional preamble may signal that the legacy part is included in the wake-up packet. Specifically, the base wireless communication terminal 2901 may insert information indicating a wake-up packet into an additional preamble. In another specific embodiment, the base wireless communication terminal 2901 may signal a wake-up packet through a modulation method of an additional preamble. At this point, the base wireless communication terminal 2901 may modulate at least one OFDM symbol that transmits an additional preamble with BPSK. In addition, the base wireless communication terminal 2901 may set the value of the service field of the L-SIG field differently from the non-HT PPDU. The specific format of the wake-up packet may be the same as that in the embodiments described with reference to FIGS. 6, 8, 11 to 13, 19, 25, 26, and 28.

Also, the base wireless communication terminal 2901 may signal information on a subsequent operation sequence through a wake-up packet. Specifically, the base wireless communication terminal 2901 may signal information identifying a wake-up subsequent operation sequence through a wake-up packet. Also, the base wireless communication terminal 2901 may signal information on a time for starting a subsequent operation sequence through a wake-up packet. In a specific embodiment, the base wireless communication terminal 2901 may signal an immediate subsequent operation sequence through a wake-up packet. Also, the base wireless communication terminal 2901 may signal a not-immediate subsequent operation sequence through a wake-up packet. Furthermore, the base wireless communication terminal 2901 may signal the target time indicating the time to start the subsequent operation sequence through the wake-up packet. At this point, the base wireless communication terminal 2901 may determine the target time based on the wake-up requiring time of the wireless communication terminal 2903. Specifically, the base wireless communication terminal 2901 may signal information on a subsequent operation sequence as in the embodiments of FIGS. 9, 10, 12, 14, and 15.

The base wireless communication terminal 2901 transmits the wake-up packet to the wireless communication terminal 2903 (S3003). The base wireless communication terminal 2901 may transmit information related to wake-up of a plurality of wireless communication terminals to the plurality of wireless communication terminals using the wake-up packet. Specifically, the base wireless communication terminal 2901 may transmit the wake-up parts for each of the plurality of wireless communication terminals using different frequency bands. Specifically, the base wireless communication terminal 2901 may operate as in an embodiment described with reference to FIGS. 11, 15, and 27.

Also, the base wireless communication terminal 2901 may transmit a WUR reference signal. Specifically, the wireless communication terminal 2901 may periodically transmit a WUR reference signal. The specific operation of the base wireless communication terminal 2901 may be the same as that in the embodiments described with reference to FIGS. 16 to 21.

If the first transmission or the first reception in the subsequent wake-up operation sequence is failed, the base wireless communication terminal 2901 may transmit the wake-up packet to the wireless communication terminal again. In addition, the base wireless communication terminal 2901 may operate as in the embodiment of FIGS. 25 to 26 to prevent re-transmission of the wake-up packet.

The wireless communication terminal 2903 receives the wake-up packet from the base wireless communication terminal 2901. The wireless communication terminal 2903 wakes up from the WUR-based power save mode based on the wake-up packet (S3005). Specifically, the wireless communication terminal 2903 may wake up the WLAN TR based on the wake-up packet. The wireless communication terminal 2903 may determine that the legacy part is included in the wake-up packet based on the modulation method of at least one OFDM symbol transmitting an additional preamble of the legacy part of the wake-up packet. Specifically, the wireless communication terminal 2903 may determine that the legacy part is included in the wake-up packet based on whether at least one OFDM symbol transmitting an additional preamble of the legacy part of the wake-up packet is modulated with BPSK. At this point, the wireless communication terminal 2903 may compare the value of the service field of the L-SIG field with the service field of the non-HT PPDU to determine whether the received PPDU is a wake-up packet. In the specific embodiment, the wireless communication terminal 2903 may determine whether the value of the service field of the L-SIG field is not all zeros.

The wireless communication terminal 2903 may wake up from the WUR-based power save mode after an arbitrary time from when the wake-up packet is received. Specifically, the wireless communication terminal 2903 may wake up the WLAN TR after an arbitrary time from when the wake-up packet is received. The wireless communication terminal 2903 may calculate an arbitrary time based on the time specified by the wake-up packet. Specifically, the wireless communication terminal 2903 may calculate an arbitrary time based on the time designated by the wake-up packet and the time required for the wake-up of the wireless communication terminal 2903. In addition, the wireless communication terminal 2903 may signal the time required for wake-up to the base wireless communication terminal 2901. The wireless communication terminal 2903 may operate as in the embodiments of FIGS. 9, 10, 12, 14, and 15.

The wireless communication terminal 2903 may access the frequency band in which the data is to be transmitted based on the priority of the data to be received in the subsequent operation sequence of wake-up. Specifically, the wireless communication terminal 2903 may perform a back-off procedure based on the priority of data to be received in a subsequent operation sequence for wake-up. In a specific embodiment, the access class indicates a QoS class, and the QoS class may be divided into VO, VI, BE, and BK. The wireless communication terminal 2903 may access the frequency band as in the embodiments described with reference to FIG. 14.

The wireless communication terminal 2903 may deliver the information obtained from the wake-up packet to the WLAN-TR. Specifically, the wireless communication terminal 2903 may transmit the information obtained from the wake-up packet to the WLAN-TR as in the embodiments described with reference to FIG. 9.

Also, the wireless communication terminal 2903 may detect a new BSS and perform an inter-BSS handover as in the embodiments described with reference to FIGS. 16 to 21.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal communicating wirelessly, the terminal comprising:
   a wireless LAN (WLAN) transceiver configured to transmit and receive a WLAN signal; and
   a wake-up radio (WUR) receiver configured to receive a WUR signal being transmitted based on on-off keying (OOK),
   wherein the WUR receiver is configured to receive a wake-up part of a wake-up packet from a base wireless communication terminal and wake-up the WLAN transceiver, wherein the wake-up packet is distinguished into a legacy part that the WLAN transceiver is capable of demodulating and the wake-up part including the WUR signal,
   wherein the legacy part comprises a legacy preamble part, which is a preamble included in a WLAN physical layer protocol data unit (PPDU) and only includes L-STF including short training signal, L-LTF including long training signal, and L-SIG including signaling information for a legacy wireless communication terminal, and an additional preamble part transmitted immediately after the legacy preamble part, wherein the L-SIG is set according to predetermined values,
   wherein the additional preamble part only includes two Orthogonal Frequency Division Multiplexing (OFDM) symbols which are Binary Phase Shift keying (BPSK) modulated.

2. The wireless communication terminal of claim 1, wherein the WUR receiver is configured to wake up the WLAN transceiver after an arbitrary time from when receiving the wake-up packet.

3. The wireless communication terminal of claim 2, wherein the arbitrary time is calculated based on a time designated by the wake-up packet.

4. The wireless communication terminal of claim 3, wherein the arbitrary time is calculated based on a time designated by the wake-up packet and a time required for waking up the WLAN transceiver.

5. The wireless communication terminal of claim 1, wherein the WLAN transceiver is configured to access a channel based on a priority of data to be received in a wake-up subsequent operation sequence.

6. The wireless communication terminal of claim 1, wherein the WUR receiver is configured to deliver information obtained from the wake-up part to the WLAN transceiver.

7. A base wireless communication terminal communicating wirelessly, the terminal comprising:
   a wireless LAN (WLAN) transceiver configured to transmit and receive a WLAN signal; and
   a wake-up radio (WUR) transmitter configured to transmit a WUR signal being transmitted based on on-off keying (OOK),
   wherein the WLAN transceiver is configured to transmit, to a wireless communication terminal, a legacy part of a wake-up packet, wherein the legacy part comprises a legacy preamble part, which is a preamble included in a WLAN physical layer protocol data unit (PPDU) and only includes L-STF including short training signal, L-LTF including long training signal, and L-SIG including signaling information for a legacy wireless communication terminal, and an additional part preamble transmitted after the legacy preamble part, wherein the L-SIG is set according to predetermined values, wherein the additional preamble part only includes two Orthogonal Frequency Division Multiplexing (OFDM) symbols which are Binary Phase Shift keying (BPSK) modulated, wherein the WUR transmitter is configured to transmit to the wireless communication terminal a wake-up part of the wake-up packet, wherein the wake-up packet indicates information related to a wake-up of the wireless communication terminal.

8. The base wireless communication terminal of claim 7, wherein the WUR transmitter is configured to transmit information related to wake-up of a plurality of wireless communication terminals to the plurality of wireless communication terminals including the wireless communication terminal using the wake-up part.

9. The base wireless communication terminal of claim 8, wherein the WUR transmitter is configured to transmit the wake-up part for each of the plurality of wireless communication terminals using different frequency bands.

10. The base wireless communication terminal of claim 7, wherein the WUR transmitter is configured to insert information on a time at which the wireless communication terminal wakes up and starts a subsequent operation sequence into the wake-up part.

11. The base wireless communication terminal of claim 10, wherein the WUR transmitter is configured to determine a time for starting the subsequent operation sequence based on the information on the time required for waking up the wireless communication terminal.

12. The base wireless communication terminal of claim 7, wherein when a first transmission or a first reception fails in a wake-up subsequent operation sequence, the base wireless communication terminal transmits the wake-up packet again to the wireless communication terminal.

* * * * *